(12) United States Patent
Tremblay et al.

(10) Patent No.: US 9,690,379 B2
(45) Date of Patent: Jun. 27, 2017

(54) TACTILE FEEDBACK INTERFACE DEVICE

(71) Applicant: IMMERSION CORPORATION, San Jose, CA (US)

(72) Inventors: Mark R. Tremblay, Mountain View, CA (US); Mark H. Yim, Palo Alto, CA (US)

(73) Assignee: Immersion Corporation, San Jose, CA (US)

( * ) Notice: Subject to any disclaimer, the term of this patent is extended or adjusted under 35 U.S.C. 154(b) by 397 days.

(21) Appl. No.: 14/340,185

(22) Filed: Jul. 24, 2014

(65) Prior Publication Data

US 2014/0337724 A1    Nov. 13, 2014

Related U.S. Application Data

(60) Division of application No. 11/580,452, filed on Oct. 13, 2006, which is a continuation of application No.
(Continued)

(51) Int. Cl.
*G06F 3/00* (2006.01)
*G06F 3/01* (2006.01)
(Continued)

(52) U.S. Cl.
CPC .............. *G06F 3/016* (2013.01); *G06F 3/011* (2013.01); *G06F 3/014* (2013.01); *G06F 3/0484* (2013.01);
(Continued)

(58) Field of Classification Search
None
See application file for complete search history.

(56) References Cited

U.S. PATENT DOCUMENTS

| 3,397,352 A | 8/1968 | Woodward |
| 3,623,064 A | 11/1971 | Kagan |
| (Continued) | | |

FOREIGN PATENT DOCUMENTS

| DE | 4400790 | 5/1995 |
| EP | 0085518 | 8/1983 |
| (Continued) | | |

OTHER PUBLICATIONS

Y. Adachi et al., "Sensory Evaluation of virtual Haptic Push-Buttons", Tech. Research Center Suzuki Motor Corp., SON 0005831, pp. 1-5.
(Continued)

*Primary Examiner* — Toan Vu
(74) *Attorney, Agent, or Firm* — Kilpatrick Townsend & Stockton LLP

(57) ABSTRACT

A system includes a host computer configured to generate a graphical interface that includes a graphical object, obtain at least one spoken utterance, control an interaction of the graphical object within the graphical interface based on the spoken utterance, and generate an activating signal based on the spoken utterance. An interface device is configured to receive the spoken utterance, provide the spoken utterance to the host computer, and control the graphical object within the graphical interface based on the provided spoken utterance. The graphical object includes a graphical representation within the graphical interface. An actuator is disposed within a housing of the interface device, thereby protecting the actuator from contact by the user, and is configured to receive the activating signal from the host computer. The activating signal causes the actuator to impart a force via the housing.

23 Claims, 20 Drawing Sheets

Related U.S. Application Data

10/460,157, filed on Jun. 13, 2003, now Pat. No. 7,755,602, which is a continuation of application No. 10/186,342, filed on Jun. 27, 2002, now abandoned, which is a continuation of application No. 09/838,052, filed on Apr. 18, 2001, now Pat. No. 6,424,333, which is a continuation of application No. 09/561,782, filed on May 1, 2000, now Pat. No. 6,275,213, which is a continuation of application No. 09/066,608, filed on Apr. 24, 1998, now Pat. No. 6,088,017, which is a continuation of application No. 08/565,102, filed on Nov. 30, 1995, now abandoned.

(51) Int. Cl.
*G10H 1/34* (2006.01)
*G06F 3/0484* (2013.01)
*G10L 15/22* (2006.01)

(52) U.S. Cl.
CPC .............. *G10H 1/34* (2013.01); *G10L 15/22* (2013.01); *G10H 2220/321* (2013.01); *G10L 2015/225* (2013.01)

(56) References Cited

U.S. PATENT DOCUMENTS

| | | |
|---|---|---|
| 3,863,098 A | 1/1975 | Mehr |
| 3,875,488 A | 4/1975 | Crocker et al. |
| 3,902,687 A | 9/1975 | Hightower |
| 3,911,416 A | 10/1975 | Feder |
| 3,919,691 A | 11/1975 | Noll |
| 4,030,208 A | 6/1977 | Carver et al. |
| 4,052,981 A | 10/1977 | Bachmann |
| 4,115,755 A | 9/1978 | Cotton |
| 4,148,014 A | 4/1979 | Burson |
| 4,262,549 A | 4/1981 | Schwellenbach |
| 4,333,070 A | 6/1982 | Barnes |
| 4,398,889 A | 8/1983 | Lam et al. |
| 4,414,984 A | 11/1983 | Zarudiansky |
| 4,436,188 A | 3/1984 | Jones |
| 4,444,205 A | 4/1984 | Jackson |
| 4,464,117 A | 8/1984 | Foerst |
| 4,477,043 A | 10/1984 | Repperger |
| 4,560,983 A | 12/1985 | Williams |
| 4,575,297 A | 3/1986 | Richter |
| 4,604,016 A | 8/1986 | Joyce |
| 4,655,673 A | 4/1987 | Hawks |
| 4,706,294 A | 11/1987 | Ouchida |
| 4,712,101 A | 12/1987 | Culver |
| 4,731,603 A | 3/1988 | McRae et al. |
| 4,769,763 A | 9/1988 | Trieb et al. |
| 4,771,344 A | 9/1988 | Fallacaro et al. |
| 4,782,327 A | 11/1988 | Kley et al. |
| 4,791,416 A | 12/1988 | Adler |
| 4,794,384 A | 12/1988 | Jackson |
| 4,795,296 A | 1/1989 | Jau |
| 4,800,721 A | 1/1989 | Cemenska et al. |
| 4,823,634 A | 4/1989 | Culver |
| 4,839,838 A | 6/1989 | LaBiche et al. |
| 4,856,078 A | 8/1989 | Konopka |
| 4,857,881 A | 8/1989 | Hayes |
| 4,868,549 A | 9/1989 | Affinito et al. |
| 4,874,998 A | 10/1989 | Hollis, Jr. |
| 4,879,556 A | 11/1989 | Duimel |
| 4,885,565 A | 12/1989 | Embach |
| 4,896,554 A | 1/1990 | Culver |
| 4,917,516 A | 4/1990 | Retter |
| 4,949,119 A | 8/1990 | Moncrief et al. |
| 4,961,138 A | 10/1990 | Gorniak |
| 4,983,901 A | 1/1991 | Lehmer |
| 4,988,981 A | 1/1991 | Zimmerman et al. |
| 5,007,300 A | 4/1991 | Siva |
| 5,022,384 A | 6/1991 | Freels et al. |
| 5,044,956 A | 9/1991 | Behensky et al. |
| 5,047,942 A | 9/1991 | Middleton et al. |
| 5,047,952 A | 9/1991 | Kramer et al. |
| 5,059,150 A | 10/1991 | Kuo |
| 5,072,361 A | 12/1991 | Davis et al. |
| 5,076,517 A | 12/1991 | Ferranti et al. |
| 5,103,404 A | 4/1992 | McIntosh |
| 5,107,262 A | 4/1992 | Cadoz et al. |
| 5,143,505 A | 9/1992 | Burdea et al. |
| 5,146,566 A | 9/1992 | Hollis, Jr. et al. |
| 5,165,897 A | 11/1992 | Johnson |
| 5,175,459 A | 12/1992 | Danial et al. |
| 5,184,009 A | 2/1993 | Wright et al. |
| 5,184,319 A | 2/1993 | Kramer |
| 5,185,561 A | 2/1993 | Good et al. |
| 5,186,629 A | 2/1993 | Rohen |
| 5,186,695 A | 2/1993 | Mangseth et al. |
| 5,193,963 A | 3/1993 | McAffee et al. |
| 5,197,003 A | 3/1993 | Moncrief et al. |
| 5,203,563 A | 4/1993 | Loper, III |
| 5,204,600 A | 4/1993 | Kahkoska |
| 5,209,661 A | 5/1993 | Hildreth et al. |
| 5,212,473 A | 5/1993 | Louis |
| 5,220,260 A | 6/1993 | Schuler |
| 5,223,776 A | 6/1993 | Radke et al. |
| 5,228,356 A | 7/1993 | Chuang |
| 5,264,768 A | 11/1993 | Gregory et al. |
| 5,275,565 A | 1/1994 | Moncrief |
| 5,280,265 A | 1/1994 | Kramer et al. |
| 5,283,970 A | 2/1994 | Aigner |
| 5,286,203 A | 2/1994 | Fuller et al. |
| 5,288,938 A | 2/1994 | Wheaton |
| 5,296,846 A | 3/1994 | Ledley |
| 5,296,871 A | 3/1994 | Paley |
| 5,309,140 A | 5/1994 | Everett, Jr. et al. |
| 5,313,230 A | 5/1994 | Venolia et al. |
| 5,327,790 A | 7/1994 | Levin et al. |
| 5,347,203 A | 9/1994 | Swinson |
| 5,354,162 A | 10/1994 | Burdea et al. |
| 5,355,148 A | 10/1994 | Anderson |
| 5,366,376 A | 11/1994 | Copperman et al. |
| 5,368,484 A | 11/1994 | Copperman et al. |
| 5,379,663 A | 1/1995 | Hara |
| 5,381,080 A | 1/1995 | Schnell et al. |
| 5,388,992 A | 2/1995 | Franklin et al. |
| 5,389,849 A | 2/1995 | Asano et al. |
| 5,389,865 A | 2/1995 | Jacobus et al. |
| 5,396,266 A | 3/1995 | Brimhall |
| 5,396,267 A | 3/1995 | Bouton |
| 5,399,091 A | 3/1995 | Mitsumoto |
| 5,405,152 A | 4/1995 | Katanics et al. |
| 5,414,337 A | 5/1995 | Schuler |
| 5,421,590 A | 6/1995 | Robbins |
| 5,429,140 A | 7/1995 | Burdea et al. |
| 5,436,622 A | 7/1995 | Gutman et al. |
| 5,437,607 A | 8/1995 | Taylor |
| 5,437,608 A | 8/1995 | Cutler |
| 5,438,529 A | 8/1995 | Rosenberg et al. |
| 5,442,729 A | 8/1995 | Kramer et al. |
| 5,451,924 A | 9/1995 | Massimino et al. |
| 5,454,043 A | 9/1995 | Freeman |
| 5,456,341 A | 10/1995 | Garnjost et al. |
| 5,459,382 A | 10/1995 | Jacobus et al. |
| 5,461,711 A | 10/1995 | Wang et al. |
| 5,466,213 A | 11/1995 | Hogan et al. |
| 5,473,235 A | 12/1995 | Lance et al. |
| 5,482,051 A | 1/1996 | Reddy et al. |
| 5,506,605 A | 4/1996 | Paley |
| 5,512,919 A | 4/1996 | Araki |
| 5,513,100 A | 4/1996 | Parker et al. |
| 5,541,831 A | 7/1996 | Thomas |
| 5,542,672 A | 8/1996 | Meredith |
| 5,547,382 A | 8/1996 | Yamasaki et al. |
| 5,559,432 A | 9/1996 | Logue |
| 5,565,840 A | 10/1996 | Thorner et al. |
| 5,575,761 A | 11/1996 | Hajianpour |
| 5,576,727 A | 11/1996 | Rosenberg et al. |
| 5,583,478 A | 12/1996 | Renzi |
| 5,587,937 A | 12/1996 | Massie et al. |
| 5,588,139 A | 12/1996 | Lanier et al. |

(56) References Cited

U.S. PATENT DOCUMENTS

| | | | |
|---|---|---|---|
| 5,589,828 A | 12/1996 | Armstrong |
| 5,589,854 A | 12/1996 | Tsai |
| 5,592,401 A | 1/1997 | Kramer |
| 5,601,529 A | 2/1997 | Wollman |
| 5,623,582 A | 4/1997 | Rosenberg |
| 5,625,575 A | 4/1997 | Goyal et al. |
| 5,629,594 A | 5/1997 | Jacobus et al. |
| 5,631,861 A | 5/1997 | Kramer |
| 5,634,794 A | 6/1997 | Hildreth et al. |
| 5,642,469 A | 6/1997 | Hannaford et al. |
| 5,643,087 A | 7/1997 | Marcus et al. |
| 5,656,901 A | 8/1997 | Kurita |
| 5,666,138 A | 9/1997 | Culver |
| 5,666,473 A | 9/1997 | Wallace |
| 5,669,818 A | 9/1997 | Thorner et al. |
| 5,674,127 A | 10/1997 | Horstmann et al. |
| 5,676,157 A | 10/1997 | Kramer |
| 5,684,722 A | 11/1997 | Thorner et al. |
| 5,691,898 A | 11/1997 | Rosenberg et al. |
| 5,701,140 A | 12/1997 | Rosenberg et al. |
| 5,709,219 A | 1/1998 | Chen et al. |
| 5,714,978 A | 2/1998 | Yamanaka et al. |
| 5,721,566 A | 2/1998 | Rosenberg et al. |
| 5,724,264 A | 3/1998 | Rosenberg et al. |
| 5,731,804 A | 3/1998 | Rosenberg |
| 5,734,373 A | 3/1998 | Rosenberg et al. |
| 5,736,978 A | 4/1998 | Hasser et al. |
| 5,739,811 A | 4/1998 | Rosenberg et al. |
| 5,742,278 A | 4/1998 | Chen et al. |
| 5,754,023 A | 5/1998 | Roston et al. |
| 5,755,577 A | 5/1998 | Gillio |
| 5,767,839 A | 6/1998 | Rosenberg |
| 5,781,172 A | 7/1998 | Engel et al. |
| 5,784,052 A | 7/1998 | Keyson |
| 5,790,108 A | 8/1998 | Salcudean et al. |
| 5,805,140 A | 9/1998 | Rosenberg et al. |
| 5,816,823 A | 10/1998 | Naimark et al. |
| 5,821,920 A | 10/1998 | Rosenberg et al. |
| 5,831,408 A | 11/1998 | Jacobus et al. |
| 5,841,423 A | 11/1998 | Carroll, Jr. et al. |
| 5,880,714 A | 3/1999 | Rosenberg et al. |
| 5,889,670 A | 3/1999 | Schuler et al. |
| 5,889,672 A | 3/1999 | Schuler et al. |
| 5,897,437 A | 4/1999 | Nishiumi et al. |
| 5,907,487 A | 5/1999 | Rosenberg et al. |
| 5,912,658 A | 6/1999 | Bergamasco et al. |
| 5,929,607 A | 7/1999 | Rosenberg et al. |
| 5,929,846 A | 7/1999 | Rosenberg et al. |
| 5,930,741 A | 7/1999 | Kramer |
| 5,944,151 A | 8/1999 | Jakobs et al. |
| 5,973,670 A | 10/1999 | Barber et al. |
| 5,986,643 A | 11/1999 | Harvill et al. |
| 5,999,168 A | 12/1999 | Rosenberg et al. |
| 6,004,134 A | 12/1999 | Marcus et al. |
| 6,028,593 A * | 2/2000 | Rosenberg ............ A63F 13/285 345/156 |
| 6,037,927 A | 3/2000 | Rosenberg |
| 6,046,726 A | 4/2000 | Keyson |
| 6,046,727 A | 4/2000 | Rosenberg et al. |
| 6,057,828 A | 5/2000 | Rosenberg et al. |
| 6,059,506 A | 5/2000 | Kramer |
| 6,061,004 A | 5/2000 | Rosenberg |
| 6,078,876 A | 6/2000 | Rosenberg et al. |
| 6,088,017 A | 7/2000 | Tremblay et al. |
| 6,100,874 A | 8/2000 | Schena et al. |
| 6,104,158 A | 8/2000 | Jacobus et al. |
| 6,125,337 A | 9/2000 | Rosenberg et al. |
| 6,131,097 A | 10/2000 | Peurach et al. |
| 6,134,506 A | 10/2000 | Rosenberg et al. |
| 6,148,280 A | 11/2000 | Kramer |
| 6,154,198 A | 11/2000 | Rosenberg |
| 6,160,489 A | 12/2000 | Perry et al. |
| 6,162,190 A | 12/2000 | Kramer |
| 6,166,723 A | 12/2000 | Schena et al. |
| 6,184,868 B1 | 2/2001 | Shahoian et al. |
| 6,191,774 B1 | 2/2001 | Schena et al. |
| 6,195,592 B1 | 2/2001 | Schuler et al. |
| 6,198,206 B1 | 3/2001 | Saarmaa et al. |
| 6,211,861 B1 | 4/2001 | Rosenberg et al. |
| 6,215,470 B1 | 4/2001 | Rosenberg et al. |
| 6,246,390 B1 | 6/2001 | Rosenberg |
| 6,271,828 B1 | 8/2001 | Rosenberg et al. |
| 6,271,833 B1 | 8/2001 | Rosenberg et al. |
| 6,275,213 B1 | 8/2001 | Tremblay et al. |
| 6,300,937 B1 | 10/2001 | Rosenberg |
| 6,323,837 B1 | 11/2001 | Rosenberg |
| 6,348,911 B1 | 2/2002 | Rosenberg et al. |
| 6,424,333 B1 | 7/2002 | Tremblay et al. |
| 6,486,872 B2 | 11/2002 | Rosenberg et al. |
| 6,639,581 B1 | 10/2003 | Moore et al. |
| 6,697,748 B1 | 2/2004 | Rosenberg et al. |
| 6,704,001 B1 | 3/2004 | Schena et al. |
| 6,876,891 B1 | 4/2005 | Schuler et al. |
| 6,912,287 B1 * | 6/2005 | Fukumoto ............ G06F 1/163 379/430 |
| 2003/0158692 A1 * | 8/2003 | Tamada ................ G06F 3/011 702/127 |
| 2010/0013761 A1 * | 1/2010 | Birnbaum ........... G06F 1/1613 345/156 |
| 2014/0003652 A1 * | 1/2014 | Fedorovskaya ... G06F 17/30286 382/103 |
| 2014/0143678 A1 * | 5/2014 | Mistry ................. G06F 3/017 715/746 |
| 2014/0143737 A1 * | 5/2014 | Mistry ................ G06F 3/0488 715/854 |
| 2014/0236598 A1 * | 8/2014 | Fructuoso ............ G10L 13/04 704/249 |
| 2014/0282275 A1 * | 9/2014 | Everitt ................. G06F 3/017 715/863 |
| 2015/0026647 A1 * | 1/2015 | Park .................... G06F 3/0488 715/863 |
| 2015/0135108 A1 * | 5/2015 | Pope ................. G06K 9/00006 715/767 |
| 2015/0193102 A1 * | 7/2015 | Lanier ................. G06F 3/017 715/746 |
| 2015/0248235 A1 * | 9/2015 | Offenberg ......... G06F 3/04886 715/773 |

FOREIGN PATENT DOCUMENTS

| | | |
|---|---|---|
| EP | 0265011 | 4/1988 |
| EP | 0349086 | 1/1990 |
| EP | 0585470 | 3/1994 |
| EP | 0607580 | 7/1994 |
| EP | 0626634 | 11/1994 |
| EP | 0 640 902 A2 | 3/1995 |
| GB | 2 254 911 | 10/1992 |
| JP | 62-194389 | 12/1987 |
| JP | S62-194389 | 12/1987 |
| JP | 63-110827 | 5/1988 |
| JP | 2079892 | 3/1990 |
| JP | 2185278 | 7/1990 |
| JP | 2295014 | 12/1990 |
| JP | 3065351 | 3/1991 |
| JP | 3067238 | 3/1991 |
| JP | 3097485 | 4/1991 |
| JP | H03-505381 A | 11/1991 |
| JP | 4008381 | 1/1992 |
| JP | 4092691 | 3/1992 |
| JP | 4111013 | 4/1992 |
| JP | 4133858 | 5/1992 |
| JP | 4232829 | 8/1992 |
| JP | 4-291289 | 10/1992 |
| JP | 5-23095 | 3/1993 |
| JP | 5049668 | 3/1993 |
| JP | 5052085 | 3/1993 |
| JP | 5-158473 | 6/1993 |
| JP | 5192449 | 8/1993 |
| JP | 05-506736 | 9/1993 |
| JP | H05-506736 A | 9/1993 |
| JP | 5333171 | 12/1993 |
| JP | 6018341 | 1/1994 |
| JP | 6047573 | 2/1994 |

(56) References Cited

FOREIGN PATENT DOCUMENTS

| | | |
|---|---|---|
| JP | 6131114 | 5/1994 |
| JP | 6159002 | 6/1994 |
| JP | 6235777 | 8/1994 |
| JP | 6259002 | 9/1994 |
| JP | 6324622 | 11/1994 |
| JP | 7020978 | 1/1995 |
| JP | 7024147 | 1/1995 |
| JP | 7073338 | 3/1995 |
| JP | 07-113703 | 5/1995 |
| JP | 7112071 | 5/1995 |
| JP | 7146751 | 6/1995 |
| JP | 7-185129 A | 7/1995 |
| JP | 7191798 | 7/1995 |
| JP | 7-213742 A | 8/1995 |
| JP | 7-219704 | 8/1995 |
| JP | 7204345 | 8/1995 |
| JP | 7219703 | 8/1995 |
| JP | 7-248873 | 9/1995 |
| JP | 7244558 | 9/1995 |
| JP | 07-266263 | 10/1995 |
| JP | 7281818 | 10/1995 |
| JP | 07-303349 | 11/1995 |
| JP | 7303349 | 11/1995 |
| JP | 9503082 | 3/1997 |
| JP | RE 37374 | 9/2001 |
| WO | WO 89/11704 | 11/1989 |
| WO | WO 91/11775 | 8/1991 |
| WO | WO 92/00559 | 1/1992 |
| WO | WO 93/18475 | 9/1993 |
| WO | WO 95/11479 | 4/1995 |
| WO | WO 95/20787 | 8/1995 |
| WO | WO 95/20788 | 8/1995 |
| WO | WO 95/32459 | 11/1995 |
| WO | WO 96/09695 | 3/1996 |
| WO | WO 99/40504 | 8/1999 |
| WO | WO 01/03105 | 1/2001 |
| WO | WO 01/24158 | 4/2001 |

OTHER PUBLICATIONS

Adlestein, Bernard D. et al., "Design and Implementation of a Force Reflecting Manipulandum for Manual Control Research," 1992, pp. 1-24.
Bernard Dov Adelstein, A Virtual Environment System for the Study of Human Arm Tremor, Massachusetts Institute of Technology, Jun. 1989, pp. 1-252.
Akamatsu, M. et al., "Multimodal Mouse: A Mouse-Type Device with Tactile and Force Display," Presence, vol. 3, No. 1, 1994, pp. 73-80.
Albers, F. Gerry, "Microcomputer Base for Control Loading," Naval Training Equipment Center 11'h NTEC-Industry Conference Proceedings, NAVTRAEQUIPCEN IH-306, Nov. 1416, 1978.
Armstrong, Brad, "The Global Navigator," Product Advertisement, at least as early as 1995.
Armstrong, Brad, "X-Shaped Actuator of Global Navigator," Technical Specification, Jun./Jul. 1993.
Atkinston, William D. et al, "Computing with Feeling," Comput. & Graphics, vol. 2, 1977, pp. 97-103.
Baigrie, Stephen A., Reflectone Inc., "Electric Control Loading—A Low Coast, High Performance Alternative," American Defense Preparedness Association 12 Interservice/Industry Training System Conference, Nov. 6-8, 1990.
James W. Ballard et al., "Human-engineered Electromechanical Tactual Sensory Control System"; Electrical and Electronic Engineering Department Commonwealth Engineering Company of Ohio Dayton, Ohio; Electrical Manufacturing; Oct. 1954; pp. 118-121; Bate Stamps MSX 0024304 thru 0024307.
Baradat, Jean and Lacroix, Michel, "Advanced Features in Control Loading and Motion Systems for Simulators," National Security Industrial Association 1st Interservice/Industry Training Equipment Conference Proceedings, Nov. 27-29, 1981.

Barlow, M. Andrew, "Z-Mouse," Computer Aided Engineering, Apr. 1993, pp. 55-56.
Batter, James J. et al., "Grope-1: A Computer Display to the Sense of Feel," Proc. IFIP Congress, 1971, pp. 759-763.
A. Bejczy et al., "A Laboratory Breadboard System for Dual-Arm Teleoperation", SOAR '89 Workshop, Jul. 25-27, 1989, MSX 0018988, pp. 1-12.
A. Bejczy at al., "Role of Computer Graphics in Space Telerobotics: Preview and Predictive Displays", MSX 0019001, 13 pgs.
A. Bejczy et al., "Universal Computer Control System (UCCS) for Space Telerobots", 1987 IEEE, MSX 0018967, pp. 318-324.
A. Bejczy, "Sensors, Controls and Man-Machine Interface for Advanced Teleoperation", Science, Jun. 20, 1980, vol. 208, No. 4450, MSX 0019039, pp. 1327-1335.
A.K. Bejczy et al., "Kinesthetic Coupling Between Operator and Remote Manipulator", Intl. Computer Tech. Conf., Aug. 12-15, 1908, MSX 0018957, 9 pgs.
James C. Bliss et al., "Optical-to-Tactile Image Conversion for the Blind", IEEE Transactions of Man-Machine Systems, vol. MMS-11, No. 1, Mar. 1970, MSX 0025821, pp. 58-65.
S.J. Bolanowski, Jr., "Four Channels Mediate the Mechanical Aspects of Touch", J. Acoust. Soc. Am., vol. 84, No. 5, Nov. 1988, MSX 0013662, pp. 1680-1694.
Mikael Bostrom et al., "Design of an Interactive Lumbar Puncture Simulator With Tactile Feedback", 1993 IEEE, MSX 0019056, pp. 280-286.
Brooks, F. et al., "Project GROPE—Haptic Displays for Scientific Visualization," Computer Graphics, vol. 24, No. 4, 1990, pp. 177-185.
Frederick P. Brooks, Jr., "Grasping Reality Through Illusion—Interactive Graphics Serving Science", 1988, MSX 0009502.
Burdea, G. et al, "Distributed Virtual Force Feedback" IEEE Workshop on Force Display on Virtual Environments and Its Application to Robotic Teleoperations (1993) pp. 25-44.
Burdea, Grigore et al., "A Portable Dextrous Master with Force Feedback," Presence: Teleoperators and Virtual Environments, MIT Press, Jun. 1991.
Grigore Burdea, "Force and Touch Feedback for Virtual Reality", A Wiley-Interscience Pulbication, 1996, pp. 199-223.
Bruce Calder, "Design of a Force-Feedback Touch-Inducing Actuator for Teleoperator Robot Control", MSX 0019351, 40 pgs.
Elaine V. Chen et al., "EXOS Slip Display Research and Development", DSC—vol. 55-1, Dynamic Systems and Control: vol. 1 ASME 1994, pp. 265-270.
William R. Corliss et al., "Teleoperator Controls", An AEC-NASA Technology Survey, NASA SP-5070, Dec. 1968, pp. 1-162.
Corrao, J.M., "Control Loading," American Institute of Aeronautics and Astronautic's Flight Simulation Update 1988, Jan. 11-15, 1988.
Corrao, Joseph M., "Control Loading," American Institute of Aeronautics and Astronautic's Flight Simulation Update 1987, Jan. 12-16, 1987.
S. Eberhardt et al., "OMAR-A Hepatic Display for Speech Perception by Deaf and Deaf-Blind Individuals", 1993 IEEE, MSX 0025913, pp. 195-201.
Ellis, R.E. et al., "Design and Evaluation of a High-Performance Prototype Planar Haptic Interface," ASME Dec. 3, 1993, DSC—vol. 49, pp. 55-64.
S.S. Fisher et al., 'Virtual Interface Environment Workstations, Pro. of the Human Factors Soc.-32' Annual Meeting, 1988, MSX 0009529, pp. 91-95.
Sara Frisken-Gibson, et al., "A 64-Solenoid, Four-Level Fingertip Search Display for the Blind", 1987 IEEE, MSX 0025790, pp. 963-965.
Giel et al."Digital Control Loading", Summary, Paper 1, Paper 2, Paper 3, International Air Transport Association, Seventh Flight Simyor Technical Sub-Committee Meeting, Agenda Item 10, Montreal, Sep. 17-20, 1984.
Glass, Thomas K., "Level 1 IntelliVIBE System Description", dated Mar. 15, 1995, PH-101-PH-107.
Moise Goldstein, Jr. et al., "Tactile Aids for Profoundly Deaf Children", J. of Acoustical Soc. of America, vol. 77, No. 1, Jan. 1985, MSX 0025811, 8 pgs.

(56) References Cited

OTHER PUBLICATIONS

Gotow, J.K. et al., "Controlled Impedance Test Apparatus for Studying Human Interpretation of Kinesthetic Feedback," Proceedings of the 1989 American Control Conference, Pittsburgh, PA, Jun. 21-23, 1989, pp. 332-337.
Gotow, J.K., et al., "Perception of Mechanical Properties at the Man-Machine Interface," IEEE X987, pp. 688-689.
Arthur C. Guyton, Textbook of Medical Physiology, 6th Ed. (1981) (603-07).
B. Hannaford et al., "Force-Feedback Cursor Control," NASA Tech. Brief, vol. 13, No. 11, Item 21m JPL Invention Report NPO-17520/7034, SON 0006566, Nov. 1989, 6pgs.
Blake Hannaford, "Models of Remote Manipulation in Space," NASA Conf. Publication 10071, 1991, pp. 37-40.
J.M. Harndon et al., "The State-of-the-Art Model M-2 Maintenance System", MSX 0012699, pp. 59-66.
Hasser, C.J. "Force-refelecting Anthropomorphic Hand Masters," Interim Report, Air Force Material Command, Wright-Patterson Air Force Base, Jul. 1995.
Hasser, Christopher John, "Tactile Feedback for a Force-Reflecting Haptic Display," The School of Engineering, University of Dayton, Dec. 1995, pp. iii-xii &1-96.
Hasser, C. et al "Tactile Feedback with Adaptive Controller for a Force-Reflecting Haptic Display," Parts 1 & 2, IEEE 0-7803-3131-1, 1996, pp. 526-533.
Vincent Hayward et al., Design and Multi-Objective Optimization of a Linkage for a Haptic Interface, McGill Univ. Elec. Eng. Dept. and Center for Intelligent Machines, MSX 0019072, pp. 359-369.
Hildreth, Bruce L., Eyermann, Roger E. and Trankle, Thomas Dr., "DC Servo-Motors for High Performance High Reliability Control Loading in Flight Simulators," American Defense Preparedness Association 12th Interservice/Industry Training System Conference, Nov. 6-8, 1990.
Hirota, Koichi et al., Development of Surface DisplayrIEEE 0-7803-1363-1, 1993, pp. 256-262.
Neville Hogan, "Stable Execution of Contact Asks Using Impedance Control," 1987 IEEE, pp. 1047-1054.
N. Hogan et al., "Haptic Illusions:Experiments on Human Manipulation and Perception of Virtual Objects", Cold Spring Harbor Symposia on Quantitative Biology, vol. LV, MSX 0009647, pp. 925-931.
Howe, Robert D., "Task Performance with a Dextrous Teleoperated Hand System," Proceedings of SPIE, 1992, vol. 1833, pp. 1-9.
Robert D. Howe, "A force-Reflecting Teleoperated Hand System for the Study of a Tactile Sensing in Precision Manipulation," 1992 IEEE, MSX 0010645, pp. 1321-1326.
Hiroo Iwata et al., Volume Haptization, Inst. of Eng. Mechanics, MSX 0026537, pp. 16-23.
Iwata, Hiroo, "Artificial Reality with Force-feedback: Development of Desktop Virtual Space with Compact Master Manipulator," Computer Graphics, vol. 24, No. 4, 1990, pp. 165-170.
A. David Johnson, Shape-memory Alloy Tactical Feedback Actuator, AAMRL-TR-90-039, Phase 1—Final Report, Air Force SBIR Contract F33-88-C-0541, Feb. 1-Aug. 1, 1989, 38 pgs.
K. Kaczmarek, et al., "Electrotactile and Vibrotactile Displays for Sensory Substitution Systems", IEEE Transactions on Biomedical Eng., vol. 38, No. 1, Jan. 1991, pp. 1-16.
Kelley, A. J. et al., "MagicMouse: Tactile and Kinesthetic Feedback in the Human-Computer Interface using an Electromagnetically Actuated Input/Output Device," Dept.of Elec. Eng..; Univ. of Brit. Columbia, 1993, pp. 1-27.
Kilpatrick, P., "The Use of a Kinesthetic Supplement in an Interactive Graphics System," Univ. of N. Carolina, 1976, pp. 1-175.
W. Kim et al., "Graphics Displays for Operator Aid in Telemanipulation", 1991 IEEE International Conf. on Systems, Man, and Cybernetics, vol. 2, MSX 0018947, Oct. 13-16, 1991, pp. 1059-1067.
J. Kirman, "Tactile Perception of Computer-Derived Formant Patterns From Voiced Speech", The J. of the Acoustical Society of America, MSX 0025859, vol. 55, No. 1, Jan. 1974, pp. 163-169.

T. Kotoku, "A Predictive Display With Force Feedback and Its Application to Remote Manipulation System With Transmission Time Delay", IEEE/RSJ International Conf. on Intelligent Robots and Systems, Jul. 7-10, 1992, pp. 239, 245-246.
T. Kotoku et al., "Environment Modeling for the Interactive Display (EMID) Used in Telerobotic Systems", IEEE Cat. No. 91TH0375-6, MSX 0019086, Nov. 3-5, 1991, pp. 999-1004.
Hans-Georg Lauffs, "Bediengerate Zur 3D-BewegungsfOhrung", Fortschritte der Robotik 9, ISBN 3-528-06439-0, pp. 1-114.
S. Lee et al., "Computer Control of Space-Bome Teleoperators Wiith Sensory Feedback", IEEE, 1985, pp. 205-214.
D.F. Leotta et al., "Preliminary Results of Speech-Reception Tests Obtained With the Synthetic Tadoma System", J. of Rehab. Research, vol. 25, No. 4, MSX 0013642, pp. 45-52.
MacKenzi, J.S. (1995), Input Devices and Interaction Techniques for Advanced Computing; In W. Barfield, & T.A. Furness III(Eds.); Virtual Environments and Advanced Interface Design, pp. 437-470; Oxford, UK; Oxford University Press, Bates Stamps SON 0076209 thru SON0076238.
B. Marcus et al., "Exotic Input Devices", NCGA '91 Conf. & Expo., Apr. 22-25, 1991, pp. 293-299.
B. Marcus, "Hands On:Haptic Feedback in Surgical Simulation", Medicine Meets Virtual Reality II, Jan. 27-30, 1994, pp. 134-139.
B. Marcus, "Touch Feedback in Surgery", Virtual Reality and Medicine the Cutting Edge, Sep. 8-11, 1994, MSX 0019163, pp. 96-97.
Massimo Bergamasco,"Haptic Interfaces: the Study of Force and Tactile Feedback Systems"; PERCRO Scuola Superiore S. Anna, Pisa, Italy; Bate Stamps SON 0016673 thru 0016678; pp. 15-20.
McVicar, Logitech 1994 Annual Review, Exhibit 136, LOGI 0132-0159.
Millman, P. et al., "Design of a Four Degree-of-Freedom Force-Reflecting Manipulandum with a Specified Force/Torque Workspace," IEEE CH2969-4, 1991, pp. 1488-1492.
M. Minsky, "The Sandpaper System for Synthesizing Texture for a Force-Feedback Display", Mass. Inst. of Tech., Jun. 1995, MSX 0025528, pp. 1-217.
Minsky, Margaret et al., "Feeling and Seeing: Issues in Force Display," Dept. of Computer Science, 1990, pp. 235-242, 270.
S. Muach et al., "Intelligent Control for Haptic Displays", Furographics, vol. 15, No. 3, 1996, MSX 0019485, pp. 217-226.
M. Noll, "Man-Machine Tactile Communication", Polytechnic Inst. of Brooklyn, Jun. 1971, MSX 0010542, pp. 1-89.
Norlin, Ken A., "Flight Simulation Software at NASA Dryden Flight Research Center," American Institute of Aeronautics and Astronautic's Flight Simulation Technologies Conference, Baltimore, MD, Aug. 7-10, 1995.
Ohu-young, M. et al., "Creating an Illustlon of Feel: Control Issues in Force Display," Computer Science Dept., Univ of N. Carolina, 1989, pp. 1-14.
M. Ouh-Young at al., "A Low-Cost Force Feedback Joystick and Its Use in PC Video Games", IEEE, 1995, MSX 0024296, pp. 787-794.
M. Ouh-Young et al., "Force Display Performs Better than Visual Display in a Simple 6-D Docking Task", IEEE, 1989, MSX 0010260, pp. 1462-1466.
M. Ouh-Young et al., "Using a Manipulator for Force Display in Molecular Docking", IEEE, 1988, MSX 0010265, pp. 1824-1829.
M. Ouh-Young, "Force Display in Molecular Docking", UMI Order No. 9034744, SON 0006106, pp. 1-368.
Patrick, Nicholas J.M. et al., "Design and testing of a Non-Reactive, Fingertip, Tactile Display for Interaction with Remote Environments," Dept. of Mechanical Engineering, 1990, pp. 215-222.
P. Platt et al., "Low-Cost Approaches to Virtual Flight Simulation", IEEE, 1991, MSX 0019117, pp. 940-946.
W.M. Rabinowitz et al., "Multidimensional Tactile Displays: Identification of Vibratory Intensity, Frequency, and Contactor Area", J. Acoust. Soc. Am, vol. 82, No. 4, Oct. 1987, MSX 0013651, pp. 1243-1252.
C. Reed et al., "Research on Tactile Communication of Speech: A Review", ASHA Monographs, No. 20, ISSN 0066-071X, MSX 0013677, pp. 1-23.

(56) References Cited

OTHER PUBLICATIONS

C.M. Reed et al., "Research on the Tadoma Method of Speech Communication", MSX 0013630, J. Acoust. Soc. Am., vol. 77, No. 1, 1985, pp. 247-257.
Resnick and Halliday, Physics for Students of Science and Engineering, Part 1, pp. 55-57; 66-73; 101-102.
H. Rheingold, "Virtual Reality", MSX 0026138, pp. 1-415.
Rinaldi, P., "Digital Control Loading—A Modular Approach," International Air Transport Association 6th Meeting of the Flight Simulator Technical Sub-Committee, Montreal, Jun. 1-4, 1982.
Roehl, Bernie, "The Logitech Cyberman," VR World, Jan./Feb. 1995, pp. 58-59.
Flight Simulation, Rolfe, J.M. and Staples, K. J., eds., 1986.
Rosenberg, Louis B., "Perceptual Design of a Virtual Rigid Surface Contact," Center for Research, Stanford University, Armstrong Laboratory, AL/CF-TR-1995-0029, 1993, pp. 1-40.
Rosenberg, Louis B., "Virtual Fixtures as Tools to Enhance Operator Performance in Environments," SPIE Telemanipulator Technology, 1993.
Rosenberg, Louis B., "Virtual Haptic Overlays Enhance Performance in Telepresence Tasks," Stanford Univ., Dept. of Mech. Eng., 1994.
Rosenberg, Louis B. et al., "Perceptual Decomposition of Virtual Haptic Surfaces," Proc. IEEE on Research Frontiers in Virtual Reality, Oct. 1993.
Russo, Massimo Andrea, "The Design and Implementation of a Three Degree-of-Freedom Force Output Joystick," Department of Mechanical Engineering, May 11, 1990, pp. 9-40 & 96 & 97.
Rutherford, M. "Third Generation Digital Flight Controls," CAE Electronics; Ltd., The Royal Aeronautical Society, 1984 Spring Convention Future Applications and Prospects for Flight Simulation, May 9-10, 1984, paper No. 15.
A.M. Sabatini et al., "Force Feedback-Based Telemicromanipulation for Robot Surgery on Soft Tissues", IEEE, 1989, MSX 0019014, 2 pgs.
Expert Witness Report of Kenneth Salisbury, Ph.D., Re: Invalidity of U.S. Pat. No. 6,275,213, Nov. 3, 2003, 167 pgs.
Expert Witness Report of Kenneth Salisbury, Ph.D., Re: Invalidity of U.S. Pat. No. 6,424,333, 82 pgs.
J.K. Salisbury et al., "Virtual Environment Technology for Training," BBN Report No. 7661, Mar. 1992, pp. 27-40.
Schmitz, Barbara, "3-D Input Devices Buyers Guide," Computer Aided Engineering, Sep. 1993, p. 26.
B. Schmult, "Data Analysis With a Force-Reflective Joystick", AT&T Bell Laboratories, SON 0076138-0076148, pp. 1-11.
Schmult Brian et al., "Application Areas for a Force-Feedback Joystick," ASME 1993, DSC—vol. 49, pp. 47-54.
W. Schneider, "The Tactile Array Stimulator", Johns Hopkins APL Technical Digest, vol. 9, No. 1, 1988, pp. 39-43.
Sears and Zemansky, "College Physica", 2nd Ed. (1952) pp. 156-157.
Seidensticker Steve, "Application of Microcomputers to the Simulator 'Linkage' Problem," National Security Industrial Association 4th Interservice/Industry Training Equipment Conference Proceedings, Nov. 16-18, 1982.
F.M. Smith et al., "Telerobotic Manipulator for Hazardous Environments", J. Robotic Systems, vol. 9, No. 2, 1992, MSX 0019017, pp. 251-260.
R. Stone, "Advanced Human-System Interfaces for Telerobotics Using Virtual Reality & Telepresence Technologies", IEEE, 1991, pp. 168-173.
R. Stone, "Virtual Reality and Telepresence", Robotics, vol. 10, 1992, pp. 461-467.
Su, S. Augustine et al., "The Virtual Panel Architecture: A 3D Gesture Framework," IEEE 0-7803-1363-1, 1993.
G. Sun, "Along for the Ride?", Scientific American, Jul. 1991, pp. 95-106.
G. Tan et al., "Human Factors for the Design of Force-Reflecting Haptic Interfaces", ASME WAM, 1994, MSX 0019470, pp. 2-11.
H. Tan et al., "Manual Resolution of Compliance When Work and Force Cues are Minimized", ASME, 1993, SON 0018727, pp. 99-104.
H. Tan et al., "Manual Resolution of Length, Force, and Compliance", DSC, vol. 42, ASME, 1992, MSX 0024309, pp. 13-18.
J.A. Terry, "Tactile Feedback in a Computer Mouse", IEEE, 1988, MSX 0025799-0025810, p. 146.
TFCS Control Switches, Dials and LED's.
The TFCS Tactile Feedback Control System.
The TFCS Tactile Feedback Control System, CT-2157.
Thorner, Craig, "Thank you for your consideration of supporting intelliVIBE in Hard Truck", Copyright 1995-2000.
Thorner, Craig, "Thank you for your consideration of supporting intelliVIBE in Mig Alley!", Copyright 1995-2000.
Thorner, Craig, "Thank you for your consideration of supporting intelliVIBE in Panzer Elite", Copyright 1995-2000.
Thorner, Craig, "Thank you for your consideration of supporting intelliVIBE in Panzer Elite!", Copyright 1995-2000, CT-2387-CT-2504.
Thorner, Craig, "Thank you for your interest in supporting intelliVIBE in Gunship!", Copyright 1995-2000.
Thorner, Craig, "Thank you for your interest in supporting intelliVIBE in Mig Alley!", Copyright 1995-2000.
Thorner, Craig, "Thank you for your interest in supporting intelliVIBE in Mig Alley!", Copyright 1995-2000, CT-2146-CT-2156.
Thorner, Craig, "Thank you for your interest in supporting intelliVIBE in USAF!", Copyright 1995-2000.
Thorner, Craig, "This Disclaimer Contains Confidential and Proprietary Information regarding intelliVIBE", Copyright 1995-2000.
Thorner, Craig, letter to Interactive Magic dated Mar. 3, 1995.
Thorner, Craig, letter to J.B. Research dated Jan. 17, 1995.
Thorner, Craig, Source Codes, PH-001-PH068.
James P. Trant, Jr., National Advisory Committee for Aeronautics; Technical Note 3355; Preliminary Investigation of a Stick Shaker As a Lift-Margin Indicator; Langley Aeronautical Laboratory, Langley Field, Va., Bate Stamps MSX 0024433 thru MSX 0024452.
H. Traunmuller, "The Sentiphone: A Tactual Speech Communication Aid", J. of Communication Disorders, Elsevier, 1980, MSX 0025893-98, 6 pgs.
U.S. District Court for Northern District of California; *Immersion Corporation* v. *Sony Computer Entertainment America, Inc., and Sony Computer Entertainment, Inc.*, and Related Counterclaims; (WDB); Document 1893; Sony's Response to Immersion's Sur-reply Regarding Sony's Motion Under Fed. R. Civ. P. 60(b) for Relief From Final Judgment; dated Nov. 17, 2005.
U.S. District Court for Northern District of California; Oakland Division; *Immersion Corporation* v. *Sony Computer Entertainment America, Inc., and Sony Computer Entertainment, Inc.*, and Related Counterclaims; (WDB); Document 1834; Rebuttal Declaration of Craig Thorner; executed Oct. 26, 2005.
U.S. District Court for Northern District of California; Oakland Division; *Immersion Corporation* v. *Sony Computer Entertainment America, Inc., and Sony Computer Entertainment, Inc.*, and Related Counterclaims; (WDB); Document 1866; Declaration of Craig Thomer (Unredacted Version Filed Under Seal); executed Jul. 6, 2005.
U.S. District Court for Northern District of California; *Immersion Corporation* v. *Sony Computer Entertainment America, Inc., and Sony Computer Entertainment, Inc.*, (WDB); Document 1867; "Agreement"; filed Nov. 1, 2005.
U.S. District Court for Northern District of California; *Immersion Corporation* v. *Sony Computer Entertainment America, Inc., and Sony Computer Entertainment, Inc.*; Document 1909; Order Denying Defendants' Motion for Relief From Final Judgment; dated Mar. 8, 2006.
U.S. District Court for Northern District of California; Oakland Division; *Immersion Corporation* v. *Sony Computer Entertainment America, Inc., and Sony Computer Entertainment, Inc. and Microsoft Corporation*, and Related Counterclaims; (WDB); Document 1846; Immersion Corporation's Unredacted (Corrected) Opposition to Defendants' Motion, Under Fed. R. Civ. P. 60(b) for Relief From Final Judgment; dated Oct. 12, 2005.

(56) References Cited

OTHER PUBLICATIONS

U.S. District Court for Northern District of California; Oakland Division; *Immersion Corporation v. Sony Computer Entertainment America, Inc., and Sony Computer Entertainment, Inc.* (WDB); Continued Videotaped Deposition of Robert D. Howe, Ph.D, dated Feb. 19, 2004; vol. 2.

U.S. District Court for Northern District of California; Oakland Division; *Immersion Corporation v. Sony Computer Entertainment America, Inc., and Sony Computer Entertainment, Inc.* (WDB); Deposition of Kicha Ganapathy; dated Feb. 3, 2004.

U.S. District Court for Northern District of California; Oakland Division; *Immersion Corporation v. Sony Computer Entertainment America, Inc., and Sony Computer Entertainment, Inc., and Microsoft Corporation*, and Related Counterclaims; (WDB); Document 1883;Immersion Corporation's Surreply in Support of Immersion's Opposition to Defendants' Motion Under Fed. R. Civ. P. 60(b) for Relief From Final Judgment; dated Nov. 4, 2005.

U.S. District Court for Northern District of California; Oakland Division; *Immersion Corporation v. Sony Computer Entertainment America, Inc., and Sony Computer Entertainment, Inc., and Microsoft Corporation*, and Related Counterclaims; (WDB); Deposition of Brian Schmult; dated Sep. 25, 2003.

U.S. District Court for Northern District of California; Oakland Division; *Immersion Corporation v. Sony Computer Entertainment America, Inc., and Sony Computer Entertainment, Inc.; and Microsoft Corporation*, and Related counterclaim; (WDB); Continued Videotaped deposition of James C. Barnes; dated Nov. 25, 2003, vol. II.

U.S. District Court for Northern District of California; *Immersion Corporation v. Sony Computer Entertainment America, Inc., and Sony Computer Entertainment, Inc.*, and Related Counterclaims; (WDB); Document 1905; Sony's Administrative Motion to Supplement Record on Rule 60(b) Motion to Add Exhibit Referenced at Argument; dated Sep. 18, 2003.

U.S. District Court for Northern District of California; Oakland Division; *Immersion Corporation v. Sony Computer Entertainment America, Inc., and Sony Computer Entertainment, Inc. and Microsoft Corporation*, and Related Counterclaims; (WDB); Document 1805; Declaration of Babak Redjaian in Support of Immersion Corporation's Opposition to Defendants' Motion Under Fed. R. Civ. P. 60(b) for Relief From Final Judgment; Executed Oct. 12, 2005.

U.S. District Court for Northern District of California; Oakland Division; *Immersion Corporation v. Sony Computer Entertainment America, Inc., and Sony Computer Entertainment, Inc.* and Related Counterclaims; (WDB); Deposition of Allan Gottlieb; dated Sep. 23, 2005.

U.S. District Court for Northern District of California; Oakland Division; *Immersion Corporation v. Sony Computer Entertainment America, Inc., and Sony Computer Entertainment, Inc.* and Related Counterclaims; (WDB); Document 1730; Declaration of Craig Thomer/Redacted Version; Executed Jul. 6, 2005.

U.S. District Court for Northern District of California; Oakland Division; *Immersion Corporation v. Sony Computer Entertainment America, Inc., and Sony Computer Entertainment, Inc.* and Related Counterclaims; (WDB); Document 1732; Declaration of Dr. Allan Gottlieb; executed Jun. 21, 2005.

U.S. District Court for Northern District of California; Oakland Division; *Immersion Corporation v. Sony Computer Entertainment America, Inc., and Sony Computer Entertainment, Inc.* and Related Counterclaims; (WDB); Document 1786; Amendment to Declaration of Craig Thomer; executed Oct. 10, 2005.

U.S. District Court for Northern District of California; Oakland Division; *Immersion Corporation v. Sony Computer Entertainment America, Inc., and Sony Computer Entertainment, Inc.* and Related Counterclaims; (WDB); Document 1864; Defendants' Motion Under Fed. R. Civ. P. 60(b) for Relief From Final Judgment; Oral Hearing Requested; Unredacted Version filed Under Seal; dated Jul. 21, 2005.

U.S. District Court for Northern District of California; Oakland Division; *Immersion Corporation v. Sony Computer Entertainment America, Inc., and Sony Computer Entertainment, Inc.* and Related Counterclaims; (WDB); Document 1865; Defendants' Reply Brief in Support of Motion Under Fed. R. Civ. P. 60(b) for Relief From Final Judgment; Oral Hearing Requested (Corrected Unredacted Version Filed Under Seal); dated Oct. 26, 2005.

U.S. District Court for Northern District of California; Oakland Division; *Immersion Corporation v. Sony Computer Entertainment America, Inc., and Sony Computer Entertainment, Inc., and Microsoft Corporation*, and Related Counterclaims; (WDB); Document 1797; Declaration of Alan J. Heinrich Attaching Exhibits in Support of Immersion Corporation's Opposition to Sony's Motion for Relief From Final Judgment Under Federal Rule of Civil Procedure 60(b); executed Oct. 12, 2005.

U.S. District Court for Northern District of California; Oakland Division; *Immersion Corporation v. Sony Computer Entertainment America, Inc., and Sony Computer Entertainment, Inc., and Microsoft Corporation*; (WDB); Videotaped Deposition of Ali Moayer; dated Oct. 23, 2003.

U.S. District Court for Northern District of California; Oakland Division; *Immersion Corporation v. Sony Computer Entertainment America, Inc., and Sony Computer Entertainment, Inc.*, and Related Counterclaims; (WDB); Continued Videotaped Deposition of Craig Alfred Thorner; dated Sep. 16, 2005; vol. 2.

U.S. District Court for Northern District of California; Oakland Division; *Immersion Corporation v. Sony Computer Entertainment America, Inc., and Sony Computer Entertainment, Inc.*, and Related Counterclaims; (WDB); Videotaped Deposition of Craig Alfred Thorner; dated Sep. 15, 2005; vol. 1.

U.S. District Court for Northern District of California; Oakland Division; *Immersion Corporation v. Sony Computer Entertainment America, Inc., and Sony Computer Entertainment, Inc.; and Microsoft Corporation*; (WDB); Deposition of James Barnes; dated Oct. 28, 2003.

U.S. District Court for Northern District of California; Oakland Division; *Immersion Corporation v. Sony Computer Entertainment America, Inc., and Sony Computer Entertainment, Inc.; and Microsoft Corporation*; (WDB); Videotaped Deposition of David McVicar; dated Oct. 23, 2003.

U.S. District Court for Northern District of California; Oakland Division; *Immersion Corporation v. Sony Computer Entertainment America, Inc., and Sony Computer Entertainment, Inc.; and Microsoft Corporation*; (WDB); Videotaped Deposition of Robert Jebens; dated Sep. 24, 2003.

U.S. District Court for Northern District of California; Oakland Division; *Immersion Corporation v. Sony Computer Entertainment America, Inc., et al.*, (WDB); Videotaped Deposition of Robert D. Howe, Ph.D, dated Dec. 23, 2003; vol. 1.

United States District Court, Northern District of California, Oakland Division; *Immersion Corporation v. Sony Computer Entertainments America Inc., Sony Computer Entertainment Inc., and Microsoft Corporation*, and Related Counterclaim; Case No. C 02-0710 CW (WDB); Declaration of Professor Robert D. Howe in Support of Immersion Corporation's Opposition to Sony Computer Entertainment Inc., and Sony Computer Entertainment America Inc.'s Motion for Summary Judgment; dated Feb. 27, 2004.

United States District Court, Northern District of California, Oakland Division; *Immersion Corporation v. Sony Computer Entertainments America Inc., Sony Computer Entertainment Inc., and Microsoft Corporation*, and Related Counterclaim; Case No. C 02-0710 CW (WDB); Sony Computer Entertainment America Inc. and Sony Computer Entertainment Inc.'s Summary Judgment Motion, dated Feb. 13, 2004, 30 pgs.

United States District Court, Northern District of California, Oakland Division; *Immersion Corporation v. Sony Computer Entertainments America Inc., Sony Computer Entertainment Inc., and Microsoft Corporation*, and Related Counterclaim; Case No. C 02-0710 CW (WDB); Sony Computer Entertainment, Inc.'s and Sony Computer Entertainment America, Inc.'s Reply to Immersion's Opposition to Sony's Motion for Summary Judgment; dated Feb. 27, 2004.

(56) References Cited

OTHER PUBLICATIONS

United States District Court, Northern District of California, Oakland Division; *Immersion Corporation v. Sony Computer Entertainments America Inc., Sony Computer Entertainment Inc., and Microsoft Corporation*; Case No. C 02-0710 CW (WDB); Order Resolving Parties' Motions for Summary Judgment; dated Mar. 2, 2004.

United States District Court, Northern District of California, Oakland Division; *Immersion Corporation v. Sony Computer Entertainments America Inc., Sony Computer Entertainment Inc., and Microsoft Corporation*, and Related Counterclaim; Case No. C 02-0710 CW (WDB); Supplemental Identification of Prior Art Pursuant to 35 U.S.C. § 282; by Defendants Sony Computer Entertainment America Inc. and Sony Computer Entertainment Inc. Pursuant to Fed. R. Civ. P. 26(a)(3); dated Aug. 16, 2004.

United States District Court, Northern District of California, Oakland Division; *Immersion Corporation v. Sony Computer Entertainments America Inc., Sony Computer Entertainment Inc., and Microsoft Corporation*, and Related Counterclaim; Case No. C 02-0710 CW (WDB); Declaration of Kenneth Salisbury, Ph. D.; executed Feb. 6, 2004.

United States District Court, Northern District of California, Oakland Division; *Immersion Corporation v. Sony Computer Entertainments America Inc., Sony Computer Entertainment Inc., and Microsoft Corporation*, and Related Counterclaim; Case No. C 02-0710 CW (WDB); Identification of Prior Art Pursuant to 35 U.S.C. § 282; by Defendants Sony Computer Entertainment America Inc, and Sony Computer Entertainment Inc. Pursuant to Fed. R. Civ. P. 26(a)(3); dated Apr. 12, 2004.

United States District Court, Northern District of California, Oakland Division; *Immersion Corporation v. Sony Computer Entertainments America Inc., Sony Computer Entertainment Inc., and Microsoft Corporation*, and Related Counterclaim; Case No. C 02-0710 CW (WDB); Defendants' Rule 50(b) Renewed Motions for Judgment As a Matter of Law, or in The Alternative, Motions for New Trial or Remittitur Pursuant to Rule 59; dated May 13, 2005.

United States District Court, Northern District of California, Oakland Division; *Immersion Corporation v. Sony Computer Entertainments America Inc., Sony Computer Entertainment Inc., and Microsoft Corporation*, and Related Counterclaim; Case No. C 02-0710 CW (WDB); Immersion Corporations's Opposition to Sony's Purported "Rule 50(b) Renewed Motions for Judgment As a Matter of Law, or in the Alternative, Motions for New Trial or Remittitur Pursuant to Rule 59"; dated May 13, 2005.

United States District Court, Northern District of California, Oakland Division; *Immersion Corporation v. Sony Computer Entertainments America Inc., Sony Computer Entertainment Inc., and Microsoft Corporation*, and Related Counterclaim; Case No. C 02-0710 CW (WDB); Reply in Support of Defendants' Rule 50(b) Renewed Motions for Judgment As a Matter of Law, or in the Alternative, Motions for New Trial or Remittitur Pursuant to Rule 59; dated May 13, 2005.

United States District Court, Northern District of California, Oakland Division; *Immersion Corporation v. Sony Computer Entertainments America Inc., Sony Computer Entertainment Inc., and Microsoft Corporation*, and Related Counterclaim; Case No. C 02-0710 CW (WDB); Order Denying Defendants' Rule 50(b) Renewed Motion for Judgment As a Matter of Law, or in the Alternative for a New Trial and Granting Defendants' Motion for Stay; dated May 17, 2005.

United States District Court, Northern District of California, Oakland Division; *Immersion Corporation v. Sony Computer Entertainments America Inc., Sony Computer Entertainment Inc., and Microsoft Corporation*, and Related Counterclaim; Case No. C 02-0710 CW (WDB); Transcript of Proceedings; vol. 9, dated Aug. 30, 2004.

United States District Court, Northern District of California, Oakland Division; *Immersion Corporation v. Sony Computer Entertainments America Inc., Sony Computer Entertainment Inc., and Microsoft Corporation*, and Related Counterclaim; Case No. C 02-0710 CW (WDB); Sony Computer Entertainment, Inc.'s and Sony Computer Entertainment America, Inc.'s Reply to Immersion's Opposition to Sony's Motion for Summary Judgment, dated Feb. 27, 2004.

United States District Court, Northern District of California, Oakland Division; *Immersion Corporation v. Sony Computer Entertainments America Inc., Sony Computer Entertainment Inc., and Microsoft Corporation*, and Related Counterclaim; Case No. C 02-0710 CW (WDB); Transcript of Proceedings; vol. 10, dated Aug. 31, 2004.

B. White, "Perceptual Findings With the Vision-Substitution System", IEEE, vol. MMS-11, No. 1, 1970, MSX 0025777, pp. 54-58.

S. Wiker, "Teletouch Display Development: Phase 1 Report", Naval Ocean Systems Central, San Diego, CA, Jul. 1988, AD-A206 919, pp. 1-48 & A-1-A-13.

Wiker, Steven F. et al., "Development of Tactile Mice for Blind Access to Computers: importance of Stimulation Locus, Object Size, and Vibrotactile Display Resolution," Proceedings of the Human Factors Society 35th Annual Meeting 1991, pp. 708-712.

Winey III, C., "Computer Simulated Visual and Tactile Feedback as an Aid to Manipulator and Vehicle Control," Mass. Institute of Tech., Mech. Engineering, 1981, pp. 1-79.

J. Wlassich, "Nonlinear Force Feedback Impedance Control", BSME Univ. of Rhode Island, 1983, pp. 1-259.

Matthias M. Wloka et al.,"The Virtual Tricorder: A Uniform Interface for Virtual Reality"; Science and Technology Center for Computer Graphics and Scientific Visualization, Brown University; Nov. 14-17, 1995; pp. 39 and 40; Bate Stamp SON 0016685 thru SON 0016686.

B. York et al., "Tools to Support Blind Programmers", ACM Press, 1989 ACM Seventeenth Annual Computer Science Conf., Feb. 21-23, 1989, pp. 5-11.

T. Zimmerman et al., "A Hand Gesture Interface Device", SON 0016669-0016672, pp. 189-192.

"File: FINDVAL.BAS" Printout of QuickBasic v4.5 Program Code, CT-1766-CT-1767.

"The Bell Laboratories Force-Feedback Joystick", SON 0076157-0076159, 3 pgs.

"Watch for Press Release for Product Availability", SON-0102810-SON-0102811.

*Quick Start Instructions* AudioSense for IndyCar and NASCAR.

*The TFCS Tactile Feedback Control System.

*This is a Basic Example of the IntelliVIBE Control Interface.

A crash course for using intelliVIBE with the TFCS.

Advertisements from Craig Thorner, CT-2017-2030.

Connecting the TFCS.

CyberMan 3D Controller; Logitech; Barnes Exhibit IMM 900; dated Nov. 25, 2003.

CyberMan 3D SWIFT Supplement Version 1.0a (Revised—Feb. 10, 1994) Logitech; McVicar Exhibit 138; Bates Stamp LOGI 0098 thru LOGI 0131.

CyberMan 3D SWIFT Supplement; Version 1.0 (Final—Dec. 7, 1993) Logitech; Exhibit 133/Barnes; Bates Stamp IMM-LOG 000001 thru 000032.

DOS*.EXE intelliVIBE Demo Files.

Flight Unlimited Operator's Manual, 1995, CT 0544-CT0602.

http://www.Bartleby.com/65/to/touch.html.

IBM Technical Disclosure Bulletin; vol. 32, No. 9B, Feb. 1990; Bate Stamp SON 0016679 thru SON 0016684.

*Immersion Corp. v. Sony Computer Entertainment America Inc., et al.*, Case No. C 02-0710CW, "Microsoft Corporation's Preliminary Invalidity Contentions Pursuant to Patent Local Rule 3-3", 123 pgs.

(56) References Cited

OTHER PUBLICATIONS

*Immersion Corp. v. Sony Computer Entertainment America Inc., et al.*, Case No. C02-0710CW (WDB), "Sony Computer Entertainment America Inc.'s and Sony Computer Entertainment Inc.'s Patent Local Rule 3-3 Disclosure of Preliminary Invalidit Contentions of U.S. Pat. Nos. 5,889,672 and 6,275,213", 97 pgs.
*Immersion Corp. v. Sony Computer Entertainment America Inc., et al.*, Case No. C02-0710CW (WDB), "Sony Computer Entertainment America Inc.'s and Sony Computer Entertainment Inc.'s Patent Local Rules 3-3 and 3-6 Disclosure of Final Invalidity Contentions of U.S. Pat. Nos. 6,275,213 and 6,424,333," 115 pgs.
*Immersion Corp. v.v Sony Computer Entertainment America Inc., et al.*, Case No. C02-0710CW (WDB), "Export Report of Prof. Robert Howe, Ph. D.", 152 pgs.
IntelliVIBE Programming Descriprion.
Logitech Annual Report 1996, LOGI 0160-0199.
Logitech Inc., Cyberman 3D Contoller Data Sheet, Copyright 1993.
Logitech Product Catalog; McVicar Exhibit 137; Bate Stamp LOGI 0086 thru 00997.
Logitech, "CyberMan 3D Controller", Logitech Advertisement, 1992.
Logitech, "The Logitech 'Cyberman'", http://incolor.inebraska.com/bill_r/logitech_cyberman.htm, Aug. 27, 2002.
Logitech, Inc., CyberMan 3D Swift Supplement, Version 1.0a, revised Feb. 10, 1994.
Meckler's 4th AnnualVirtual Reality 93 Conference & Exhibition May 19-21; Bate Stamp SON 0102415 thru SON 0102446.
Nascar Racing Game Manual, 1994, CT-0447-CT0543.
Papyrus, CT-1920-CT-2006.
Pictures of Craig Thorner's VRF tactile feedback system—CT 2506A-2541 A.
Press Release, SON 0102819.
Programs, CT-1301-CT-1654.
Relaxor, "Stress Reducing Massage System" advertisement, CT-0083.
Report of Flight Simulator Technical Sub-Committee 7th Meeting Montreal, Sep. 17-20, 1984, DOC.GEN/2834, MSX 0025504, 17 pgs.
Screenshot printouts of Thorner programs, CT-1267-CT-1300.
Screenshots of Thorner programs, CT-1768-CT-1817.
Suggestions for Implementing intelliVIBE Control.
The Electrical Engineering Handbook, Dorf, ed., 1993, pp. 711-713.
This is a Basic Example of the IntelliVIBE Control Interface.
Using intelliVIBE—the 60 second "creash course" version, CT-1756-CT1765.
Using intelliVIBE—the 60 second "creash course" version, CT-2365-2374.
Various manuals from Craig Thorner—CT-2387-2504.
Virtual Reality; Spring1995, Special Report; A Miller Freeman Publication; Bate Stamp SON 0102447 thru SON 0102526.
Virtual Vehicles by Interactive I/O, CT-0900-CT-0901.
VREAM Inc., VREAM Virtual Reality Development System Reference Manual 1.0, 1993, 1-141 and 1-147 to 1-148 (Bate Stamp SON 0102955 thru SON0103480).
VREAM Inc., VREAM Virtual Reality Development System user's Guide 1.0, 1993, pp. 4-8; 5-20 to 5-21; and 9-23 (Bate Stamp SON 0103481 thru SON 0104256).
VRWorld, The Magazine for Virtual Reality Development and Utilization, Jan./Feb. 1995, SON 0102885-0102954.
Aukstakalnis, Steve et al., "Silicon Mirage: The Art and Science of Virtual Reality," Berkeley, CA, Peach Pit Press, 1992, pp. 129-180.
Bejczy, Antal K. et al., "Generalization of Bilateral Force-Reflecting Control of Manipulators," Proceedings of Fourth CISM-IFToMM Symposium on Theory and Practice of Robots and Manipulators, Zaborow, Poland, Sep. 8-12, 1981, 14 pages.
Burdea, Grigore et al., "Dextrous Telerobotics with Force Feedback," Robotica, vol. 9, pp. 171-178.
Durlach, Nathaniel I. et al., "Virtual Reality: Scientific and Technological Challenges," National Academy Press, Washington, D.C., 1995, pp. 160-205.
Howe, Robert D., "A Force-Reflecting Teleoperated Hand System for the Study of Tactile Sensing in Precision Manipulation," Proceedings of the 1992 IEEE International Conference on Robotics and Automation, vol. 2, 1992, pp. 1321-1326.
Jacobsen, Stephen C. et al., "High Performance, Dextrous Telerobotic Manipulator With Force Reflection," Intervention/ROV '91 Conference & Exposition, Hollywood, Florida, May 21-23, 1991, pp. 213-218.
Kim, Won S. et al., "Graphics Displays for Operator Aid in Telemanipulation," Jet Propulsion Laboratory, ISSN# 0-7803-0233-8/91, 1991, pp. 1059-1067.
Massimino, Michael J. et al., "Sensory Substitution for Force Feedback in Teleoperation," Presence: vol. 2, No. 4, 1993, pp. 344-352.
Rosenberg, Louis B., "Virtual Fixtures": Perceptual Overlays Enhance Operator Performance in Telepresence Tasks, Dept. of Mechanical Engineering, Stanford University, Aug. 1994, pp. ii-214.
Shimoga K., "Finger Force and Touch Feedback Issues in Dexterous Telemanipulation", in: Proceedings Fourth Annual Conference on Intelligent Robotic Systems for Space Exploration, Rensselaer Polytechnique Institute, Troy, NY, Sep. 30-Oct. 1, 1992, pp. 159-178.
Shimoga, Karun B., "A Survey of Perceptual Feedback Issues in Dexterous Telemanipulation: Part II. Finger Touch Feedback," IEEE 1993, pp. 271-279.
Yamakita, M. et al., "Tele Virtual Reality of Dynamic Mechanical Model," Proceedings of the 1992 IEEE/RSJ International Conference on Intelligent Robots and Systems, Jul. 7-10, 1992, pp. 1103-1110.
Notice of Reasons for Rejection as issued for Japanese Patent Application No. P2011-267054, dated Feb. 5, 2013.
Notice of Reasons for Rejection as issued for Japanese Patent Application No. P2011-267055, dated Feb. 5, 2013.

* cited by examiner

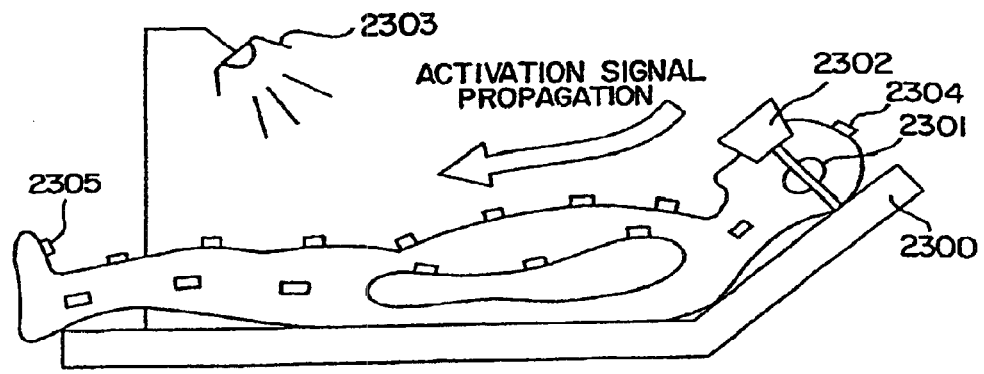
FIG. 23
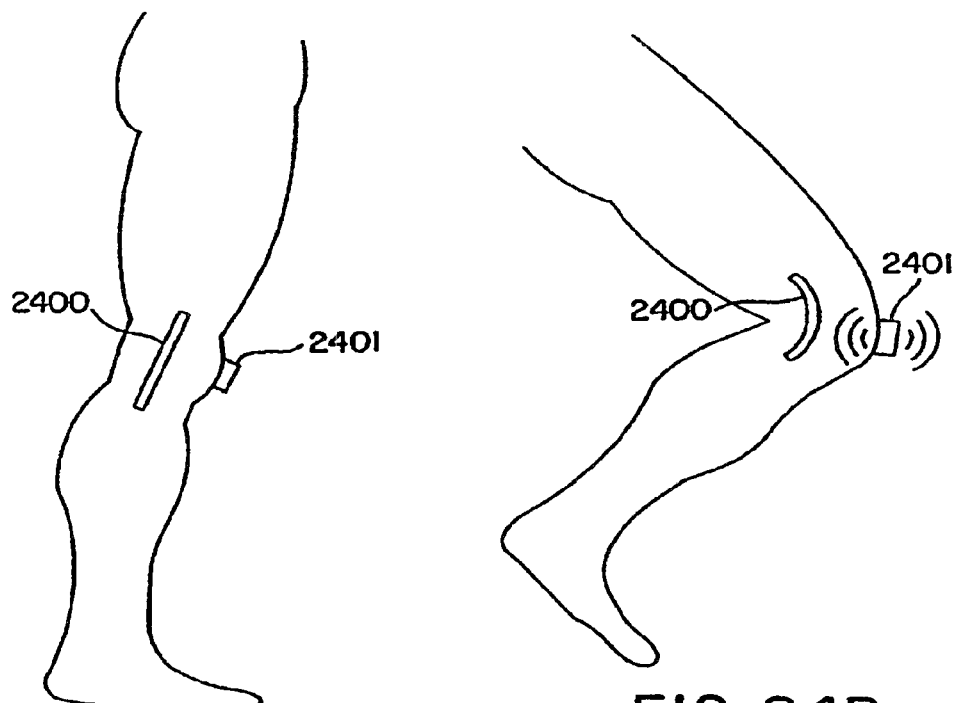
FIG. 24A
FIG. 24B

TACTILE FEEDBACK INTERFACE DEVICE

CROSS-REFERENCE TO RELATED APPLICATIONS

This application is a divisional application of U.S. patent application Ser. No. 11/580,452, filed Oct. 13, 2006, which is a continuation of U.S. patent application Ser. No. 10/460,157, filed Jun. 16, 2003 and issued as U.S. Pat. No. 7,755,602 on Jul. 13, 2010, which is a continuation application of U.S. application Ser. No. 10/186,342, filed Jun. 27, 2002 and now abandoned, which is a continuation of U.S. patent application Ser. No. 09/838,052, filed Apr. 18, 2001 and issued as U.S. Pat. No. 6,424,333 on Jul. 23, 2002, which is a continuation of U.S. patent application Ser. No. 09/561,782, filed on May 1, 2000 and issued as U.S. Pat. No. 6,275,213 on Aug. 14, 2001, which is a continuation of U.S. patent application Ser. No. 09/066,608, filed Apr. 24, 1998 and issued as U.S. Pat. No. 6,088,017 on Jul. 11, 2000, which is a continuation of U.S. patent application Ser. No. 08/565,102, filed Nov. 30, 1995, now abandoned, and all of which are incorporated herein by reference in their entireties.

FIELD

This invention relates to a man-machine interface and in particular to an interface that provides tactile sensation to a user.

BACKGROUND

Virtual reality (VR) is an immersive environment which is created by a computer and with which users have real-time, multisensorial interactions. Typically, these interactions involve some or all of the human senses through either visual feedback, sound, force and tactile feedback (i.e. reflection), smell and even taste. The key to immersive realism is the capacity of the user to use his/her hand to interactively manipulate virtual objects. Unfortunately, the majority of existing commercial virtual reality systems use hand-sensing devices that provide no haptic feedback. Nevertheless, some efforts have been made to provide means for presenting force and tactile information to the user's hand. By force information, it is meant the application of a set force to a selected part of the hand, for example, a finger. By tactile information, it is meant the application of a stimuli, e.g., a vibration, to a selected part of the hand, e.g., a fingertip pad. This stimulus, could simulate surface texture or dynamic conditions at the contact, for example. A few examples of existing force reflecting devices are the EXOS SAFiRE™, the Master II Hand Master device at Rutgers university, the PERCRO Force-Reflecting Hand Master and the Sarcos TOPS Force-Reflecting Hand Master. Some tactile feedback devices that have been developed include the PERCRO Position-Sensing and Tactile Feedback Hand Master and the EXOS TouchMaster™.

Virtual reality is not the only field where it is desirable to feed back force and tactile information to a human user/operator. Another common area is telerobotics. Some of the devices mentioned above are also often used as telerobotics interfaces. Some examples in the literature of feedback devices designed more specifically for telerobotics include the tactile shape sensing and display system developed by Kontarinis et al., the voice-coil based tactile feedback device used by Patrick et al. and the pin-based tactile display array developed by Kaczmarek and Bach-y-rita. Other applications for a vibrotactile unit of the subject invention include, but are not limited to, gesture recognition, music generation, entertainment and medical applications.

In an ideal case, it would be desirable to provide full force and tactile feedback to a user to make the virtual reality or telerobotic experience as realistic as possible. Unfortunately, most force feedback devices are cumbersome, heavy, expensive and difficult to put on and remove. Many of the tactile feedback solutions are also cumbersome, complex and fragile. Additionally, some of the tactile feedback devices described in the literature, such as small voice coils mounted to directly contact the skin, tend to numb the skin after only a few seconds of operation and then become ineffective as feedback devices.

SUMMARY

An object of the invention is a man-machine interface which may be employed in such areas as interactive computer applications, telerobotics, gesture recognition, music generation, entertainment, medical applications and the like. Another object of the invention is a mass which is moved by a "mass-moving actuator" which generates a vibration that a user can feel. Yet another object of the invention is the generation of an activating signal to produce the vibrations either as a result of the user's state or as a result of environmental conditions, whether virtual or physical. Still another object of the invention is vibrating the bone structure of a sensing body part, as well as skin mechanoreceptors, to provide feedback. Yet still another object of the invention is the complex actuation of vibratory devices.

The tactile sensation that a user feels is generated by a vibrotactile unit mounted on, or in functional relation to, a sensing body part of a user by a fastening means. In one embodiment, the vibrotactile device comprises a mass connected eccentrically to a mass-moving actuator shaft (i.e. the center of mass of the mass is offset from the axis of rotation). Energizing the mass-moving actuator causes the shaft to turn, which rotates the eccentric mass. This rotating mass causes a corresponding rotating force vector. A rapidly rotating force vector feels to the user as a vibration. A slowly rotating force vector feels like a series of individual impulses. For a small number of rapid rotations, the rotating force vector feels like a single impulse. We will use the term "vibration" to denote a change in force vector (i.e., direction or magnitude). Examples of vibrations include, but are not limited to a single impulse, a sinusoidal force magnitude, and other functions of the force vector. We use the term "tactile sensation" to refer to the feeling perceived by a user when their sensing body part experiences vibrations induced by a vibrotactile unit.

A signal processor interprets a state signal and produces an activating signal to drive the mass-moving actuator. The variable components of the state signal may be physical (e.g., measured), or virtual (e.g. simulated, or internally generated); they may vary with time (e.g., the state variables may represent processes); and they may be integer-valued (e.g., binary or discrete) or real-valued (e.g., continuous). The signal processor may or may not comprise a computer which interprets and further processes the state signal. The signal processor comprises a signal driver which produces an activating signal supplying power to, or controlling the power drawn by, the vibrotactile unit. The power may be, but is not restricted to, electric, pneumatic, hydraulic, and combustive types. The driver may be, but is not restricted to, an electric motor controller comprising a current amp and sensor for closed loop control, a flow valve controlling the amount of a pressurized fluid or gas, a flow valve controlling the amount of fuel to a combustion engine and the like. The details of such a signal processor and mass-moving actuator are common knowledge to someone skilled in the art.

The state signal may be generated in response to a variety of conditions. In one embodiment, one or more sensors measuring physical conditions of the user and/or the user's environment may generate one or more components of a physical state signal. In another embodiment, a computer simulation may determine the one or more components of a virtual state signal from a simulated (e.g., virtual) state or condition. The virtual state may optionally be influenced by a physical state. The virtual state includes anything that a computer or timing system can generate including, but not restricted to, a fixed time from a previous event; the position, velocity, acceleration (or other dynamic quantity) of one or more virtual objects in a simulation; the collision of two virtual objects in a simulation; the start or finishing of a computer job or process; the setting of a flag by another process or simulation; combinations of situations; and the like. The virtual state signal is a machine-readable measurement of the virtual state variables.

The physical state signal is measured from physical state variables. These variables have relevance to the physical state of a body part of the user or the user's physical environment. The physical state variables includes any measurable parameter in the environment or any measurable parameter relating to a body part of the user. Some examples of measurable physical parameters in an environment include but are not restricted to, the state of a body part, the position of objects in the environment, the amount of energy imparted to an object in the environment, the existence of an object or objects in the environment, the chemical state of an object, the temperature in the environment, and the like. The state of a body part may include the physical position, velocity, or acceleration of the body part relative to another body part or relative to a point in the environment. The state of a body part may also include any bodily function, where the measured state signal may include the output from an electroencephalograph (EEG), electrocardiograph (ECG), electromyograph (EMG), electrooptigraph (EOG) or eye-gaze sensor, and sensors which measure joint angle, heart rate, dermal or subdermal temperature, blood pressure, blood oxygen content (or any measurable blood chemical), digestive action, stress level, voice activation or voice recognition, and the like. The user's voice may constitute a measured physical state variable, where his spoken words are sensed and/or recognized to generate a corresponding activating signal. The physical state signal is a machine-readable measurement of the physical state variables.

The state signal is presented to the signal processor which interprets the state, and then determines how and when to activate the vibrotactile units accordingly. The signal processor produces an activating signal which may be in response to an event it interprets from the state signal. Examples of events include contact, gestures, spoken words, onset of panic or unconsciousness, and the like. The interpretation of the state signal may or may not be a binary event, i.e. the simple changing of state between two values. An example of a binary event is contact vs. non-contact between two virtual or real objects. The process of interpreting may include any general function of state variable components. The interpretation function may produce an output control value which is integer or real-valued. A non-binary-valued interpretation output typically relates to the signal processor producing a non-binary activation signal.

By varying the functional form of the activation signal, the type of feedback that the vibrotactile device generates may also be varied. The device may generate a complex tactile sensation, which is defined to be a non-binary signal from a single or multiple vibrotactile units. Examples of complex tactile sensations include (1) varying the amplitude of vibration with a profile which is non-uniform over time; (2) varying the frequency of vibration; (3) varying the duration of impulses; (4) varying the combination of amplitude and frequency; (5) vibrating two or more vibrotactile units with a uniform or non-uniform amplitude profile; (6) sequencing multiple vibrotactile units with different amplitude or frequency profiles; and the like.

The frequency and amplitude of the vibration or impulse may be changed by modifying the activating signal to the mass-moving actuator. The frequency and amplitude may also be controlled by increasing the mass or by changing the radius of gyration (e.g. changing its eccentricity). For example, the mass may be changed by pumping fluid into an eccentrically rotating container. The sense of frequency that the user perceives may be changed independently of the amplitude by modulating the power to the vibrotactile unit at a variable frequency. This technique is called amplitude modulation, which is common knowledge to those skilled in the art. This change in frequency and amplitude may be used to convey complex, compound or other forms of information to the user.

Sensors may be mounted on the vibrotactile unit or the sensing body part to determine the frequency and amplitude of vibration sensed by the user. A feedback control loop may be added which uses this information to more tightly control the frequency and amplitude, or to reach peak efficiency at the resonant frequency of the collective vibrating device-body system.

Examples of a sensing body part on which the vibrotactile unit may be mounted, or in functional relation to the vibrotactile unit, include, but are not limited to: the distal part of a digit, the dorsal (back) side of a phalanx or metacarpus, palm, forearm, humerus, underarm, shoulder, back, chest, nipples, abdomen, head, nose, chin, groin, genitals, thigh, calf, shin, foot, toes, and the like. A plurality of vibrotactile units may be disposed on or near different sensing body parts, and may be activated in unison or independently.

Each vibrotactile unit may be affixed to the body by a fastening means. The fastening means is defined to be the means of attaching the vibrotactile unit to a sensing body part, transmitting (and possibly modifying) the vibrations created by the vibrotactile unit. This means may be one that is flexible such as a strap made of cloth or soft polymer, or rigid, such as metal or hard polymer which grabs or pinches the flesh, skin or hair. The fastening means may also include gluing or taping to the skin or hair, or tying with a string or rope around a limb, or attaching to clothes with VELCRO®. or similarly functional means. A vibrotactile unit may also be attached to another structure which is then attached to the body part with the same means just mentioned. The vibrations generated by the actuator may be transmitted to the sensing body part by the structure (rigid or non-rigid), or through a linkage transmission or a fluid transmission.

The eccentric mass need not be mounted directly onto a motor shaft. A mechanical transmission may rotate the mass on a different shaft than the motor shaft. The mass-moving actuator rotates this shaft. Fluids such as air and liquids may also transmit the motion from a power source to the rotating eccentric mass. Changing magnetic fields may also be employed to induce vibration of a ferrous mass.

As previously mentioned, state signals may relate to a physical or virtual state. When the state represents a physical condition, the subject invention includes a state measurement sensor which produces a state signal. This state measurement sensor may measure some property of the sensing body part. Recall that the body part associated with receiving the vibrotactile stimulation is called the sensing body part, the body part associated with producing the activating signal is called the measured body part. The signal processor may receive signals from this sensor such as a tactile, position, bend, velocity, acceleration or temperature sensor and generate an activating signal. In this way, the user may receive feedback based on his actions or physical state. For example, the vibrotactile device may be used to train the user to do some physical motion task. In this case, the position or motion of the body part which is to do the motion task is measured by the state measurement sensor and is also the sensing body part. Direct stimulation to the body part being trained enhances the training of the task. Complex actuation in the form of a function of different levels of frequency or amplitude may inform the user whether his actions are correct or incorrect; the level of correctness may correspond to the level of frequency or amplitude.

In addition, the sensing body part (which is also the measured body part) may have a graphical representation shown to the user. The user may also be presented with visual, auditory, taste, smell, force and/or temperature cues to his actions in combination with the vibrotactile cues provided by the subject invention. The user may be immersed in a virtual environment. The user may see a graphical representation of his/her body part interact with virtual objects and simultaneously feel a corresponding tactile sensation simulating the interaction. For example a user may have his/her fingers be the sensing and measured body parts. The user may then see his/her virtual hand in the virtual environment contact a virtual object. The user would then feel an increasing vibratory stimulation on his/her physical fingertip as he increased the virtual pressure on the virtual object using the virtual fingertip.

As previously discussed, using the vibrotactile device of the subject invention, a user may receive tactile sensations based on the state of his body parts. In the previous case the state included the position, and other dynamic quantities, of the body parts. In certain applications, the measured body part is the same as the sensing body part (the list of possible sensing body parts mentioned earlier also applies to measured body parts); in other applications they are different body parts. When the measured body part is different than the sensing body part, the subject invention acts as a coupling device which relates the sensing body part and the measured body part.

In another application, the user may receive tactile feedback as a result of the conditions of a computer simulated environment, not necessarily related to the user's actions or state. The vibrotactile units with varying actuation levels may be used to simulate a variety of contact situations, e.g., contact with fluids and solids, and contacts which are momentary or continuous. For example, a user immersed in a computer simulated virtual environment may feel simulated fluid (like air or water) across his body. In such a simulation, an array of vibrotactile units may vibrate in sequence to correspond to a pressure wave hitting the corresponding parts of the body; the amplitude of the vibration may vary to correspond to different levels of pressure being simulated. A user may also feel a virtual object that comes into contact with a portion of his virtual body. The user may feel a virtual bug crawl up his virtual arm by sequencing an array of vibrotactile units. To accompany the tactile sensations received by the user which are uncorrelated with his actions, the user may be presented with visual, auditory, taste, smell, force, temperature and other forms of feedback in order to enhance the realism of the simulated environment.

In yet another application of the vibrotactile device, a group of users may receive tactile sensations. In one example, users may wear individual vibrotactile units, or they may also share vibrotactile units as follows. A tactile sensation may be shared by one or more users making physical contact with the sensing body part of another user. For example, one user may wear vibrotactile units on the backs of his fingers. A second user, not wearing any vibrotactile units, may obtain vibrotactile feedback transmitted via the first user when the first user places the palmar side of his fingers on a sensing body part of the second user. The activating signal for each vibrotactile unit may be computer controlled via either user's actions or through a computer simulated event. In a second example, a group of users may each receive identical tactile feedback through individually mounted vibrotactile units. The common activating signal may correspond to measured body parts from a single, optionally separate, user. Different users may also be responsible for producing the common activating signal for one or more vibrotactile units. For instance, the movement of one user's arm may control the vibrotactile unit on each user's arm; and the voice of a second user may control the vibrotactile unit on each user's back; the eye-gaze of three other users may control the vibrotactile unit upon which they stare in unison. An example application of a single user controlling many user's vibrotactile sensations is a new form of entertainment where a performer creates vibrotactile sensations for an audience.

In a preferred embodiment, the vibrotactile units are affixed to an instrumented glove, such as the CyberGlove™ manufactured by Virtual Technologies of Palo Alto, Calif, USA. The CyberGlove has sensors in it which measure the angles of the joints of the hand. The fingertips of the CyberGlove are open so that the user may reliably handle physical objects while wearing the glove. The open fingertips allow the user to feel the sensations of real objects in conjunction with the generated vibrotactile sensations. The fingertips need not be open, they may be fully enclosed as in the 22-sensor model of the CyberGlove. The mass-moving actuator of each vibrotactile unit is encased in a cylindrical housing and mounted onto the glove on each of the fingers and thumb, and on the palmar side of the hand. Each mass-moving actuator is composed of a small DC motor with an eccentric mass mounted rigidly onto the shaft of the motor. The casing is made of tubular plastic and serves to protect the motion of the mass from the user and protect the user from the rotating mass. The casing may be made of any rigid or semi-rigid material including but not limited to steel, aluminum, brass, copper, plastic, rubber, wood, composite, fiberglass, glass, cardboard, and the like. The casing may form a solid barrier, a wire-mesh, grid or column-like support capable of transmitting vibrations from the mass-moving actuator to the fastening means. The instrumented glove informs a computer of the position of the user's hand and fingers. The computer, which is part of the signal processor, then interprets this hand state signal (and any virtual state signal if the application calls for it). The computer then generates a control signal, which when processed by the driver, activates the actuators to create tactile sensations.

One feature of the embodiment of the subject invention just described, which employs an eccentric mass, is that the energy imparted into the system can be less than the energy required when using electromagnetic coils (such as the speaker voice coils used by Patrick et al. and the EXOS TouchMaster). Energy is stored as rotational inertia in the eccentric mass, whereas the voice-coil-based systems lose all inertial energy each time the coil change directions.

Another feature of the subject invention is that vibrating the bone structure of a body part, as well as skin mechanoreceptors, has an advantage over stimulating just the skin mechanoreceptors (such as Meissner, Merkel, Ruffini and Pacinian corpuscles) in that the nerves do not get easily overstimulated and do not become numb. In addition, the form of information to the user is closer to a physical contact sensation where the muscles and joints are stimulated, as is done by full force feedback systems. As a result, the vibrotactile units need not be attached to a body part which has sensitive skin mechanoreceptors. For example, a vibrotactile unit may be attached to a fingernail or an elbow.

In an embodiment in which a user is immersed in a computer simulated environment, actuation of vibrotactile units can approximate the sensation of touching physical objects as full force feedback devices do. The deep impulsive sensation in the muscles and joints generated by the vibrotactile units simulates the change in proprioceptive state as the user touches a virtual object. The subject invention provides numerous advantages over a sustained force feedback device. For example, because of its simplicity, the vibrotactile device of the subject invention can be made smaller, lighter, less encumbering, more robustly and cheaper.

The subject invention may be used in combination with a sustained force feedback device as provided by Kramer in U.S. Pat. No. 5,184,319, Kramer in U.S. patent application Ser. No. 08/373,531 (now U.S. Pat. No. 5,631,861), Zarudiansky in U.S. Pat. No. 4,302,138, Burdea in U.S. Pat. No. 5,354,162, and Jacobus in U.S. Pat. No. 5,389,865. These patents and patent applications are incorporated herein by reference. Such a combination can give a higher frequency response than that capable of being generated by the sustained force feedback device and/or to reduce the cost and/or size of the full system. The subject invention may also be used in combination with other tactile feedback devices such as heating or cooling devices, bladder devices or voice coils.

BRIEF DESCRIPTION OF THE DRAWINGS

FIGS. 16a, 16b, and 16c illustrate the principle, where $w_2 > w_1 > 0$.

FIG. 19a shows a virtual reality application. FIG. 19b shows a telerobotic application.

In FIG. 21a, the gesture is static and in FIG. 21b, the gesture is dynamic (the index finger is moving in a pre-determined fashion).

FIG. 23 is a schematic drawing showing an entertainment or relaxation application.

FIGS. 24a and 24b is a schematic drawing showing a medical application.

DETAILED DESCRIPTION

Figure 1A:
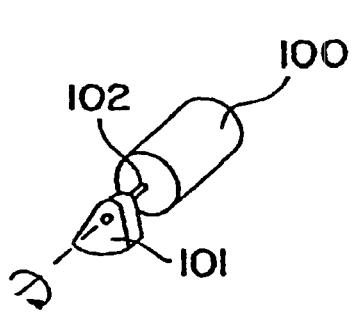
FIG. 1a is a perspective view of an electric mass-moving actuator with an eccentric mass attached to its shaft.

FIG. 1a shows one embodiment of a vibrotactile unit obtained by attaching an eccentric mass (101) to the shaft (102) of a small d.c. electric motor (100) which serves as the mass-moving actuator. Here the mass is pie-shaped, however any other shape which offsets the center of gravity from the axis of rotation, and thus provides eccentricity, may be used. This eccentricity causes the force vector to change directions during rotation and thus induces vibrations in the unit. The mass may be made of any material like steel, aluminium, plastic or fluid encased in a container, to name a few.

Figure 1B:
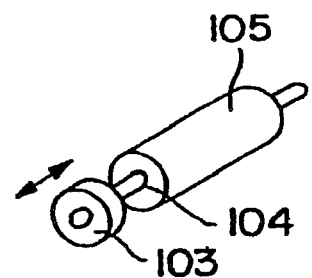
FIG. 1b is a perspective view of a mass-moving linear actuator with a mass attached to its shaft.

FIG. 1b shows another embodiment of a vibrotactile unit obtained by attaching a mass (103) to the shaft (104) of a linear mass-moving actuator (105). Here the mass is disk-shaped, however any other shape may be used. The linear actuator moves the mass back and forth and thus induces vibrations in the unit by suddenly accelerating and decelerating it. The mass may be made of any material like steel, aluminium, plastic or fluid encased in a container, to name a few.

Figure 2A:
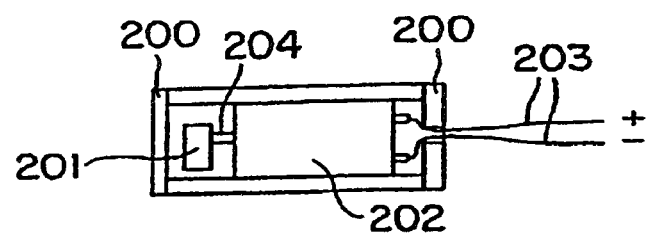
FIGS. 2a and 2b are a cross-sectional side view and a perspective view respectively of an example of a vibrotactile unit.
Figure 2B:
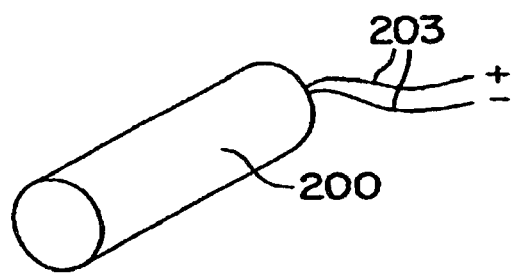

FIG. 2a and FIG. 2b are cross-sectional and perspective drawings respectively of an example of a casing (200) in which a mass-moving actuator (202) and a mass (201) are contained. Again, the eccentric mass (201) is attached to the shaft (204) of the electric motor. The casing has a hole for the motor leads (203) to escape. The casing protects the moving mass from being disturbed by the user. It also protects the user from being hit by the mass. The casing may be made from any rigid material, or variety of materials, such as aluminum, steel, plastic, glass, glass fiber composite etc. It is typically desirable to have a small light weight mass-moving actuator, mass, casing and fastening means so that the device may be as unencumbering as possible. From here on, this embodiment of the invention will serve as the sample vibrotactile unit used in many of the subsequent figures.

Figure 3:
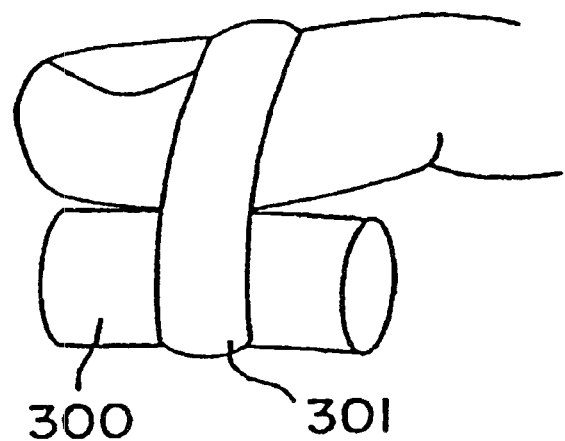
FIG. 3 is a perspective view of the vibrotactile unit shown in FIG. 2b where the vibrotactile unit is attached to the palmar side of the fingertip.

FIG. 3 illustrates one fastening means for attaching the vibrotactile unit to a finger. In this example, the vibrotactile unit (300) is attached directly to the palmar side of the fingertip using a fastening means (301). The fastening means may be made of either flexible material, such as cloth, fabric, tape, VELCRO®. or a soft polymer, or it may be made of a rigid material such as a metal, hard polymer or wood, to name a few. The fastening means need not encircle the finger entirely, it may grab the finger by clamping or pinching, or by sticking to it such as with glue or tape. Also, if the user is wearing a glove, the vibrotactile unit may also be sewn onto the glove or bonded to it and need not be affixed directly to the hand. This will also be the case in the following figures which illustrate various ways to position the vibrotactile unit on the human body.

Figure 4:
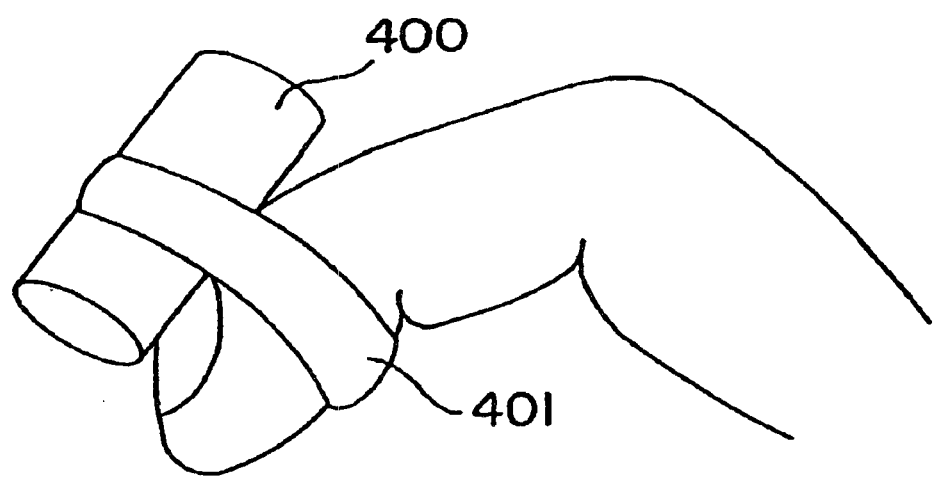
FIG. 4 is another perspective view of a vibrotactile unit attached to the dorsal side of the fingertip, where it makes contact with the nail.

FIG. 4 illustrates another way of mounting the vibrotactile unit (400) onto the finger using a fastening means (401). In this case the unit is positioned directly above the fingernail on the dorsal side of the fingertip (the sensing body part) in order to provide a distinctive tactile sensation, or vibratory stimulus. The unit may vibrate the nail, the flesh underneath and the bone with sufficient amplitude that the sensation is felt throughout the finger, not just locally at the skin.

Figure 5:
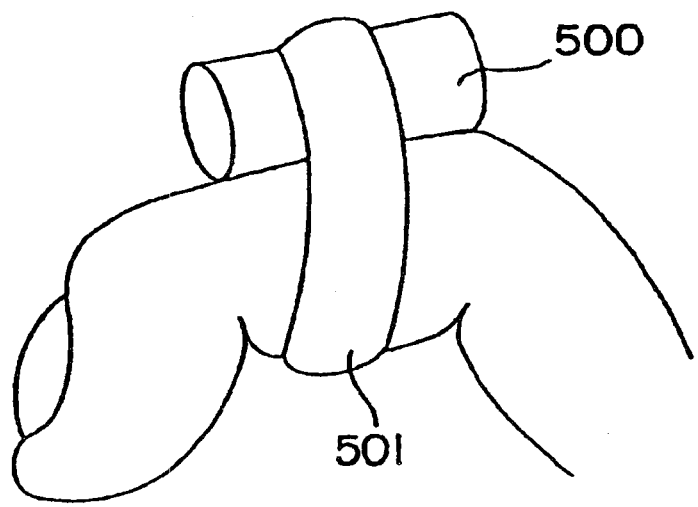
FIG. 5 is a perspective view of a vibrotactile unit attached to the dorsal side of the proximal phalanx.

FIG. 5 illustrates another way of mounting the vibrotactile unit (500) onto the finger using a fastening means (501). In this case the unit is positioned on the dorsal side of the proximal phalanx. Since the unit gives sensation throughout the entire finger, touching virtual objects with the palmar side of the hand will still give sensations to that side even though it is mounted on the back. When used in conjunction with manipulating physical objects with the palmar side, the vibrational sensation on the palmar side is enhanced. These features are not limited to the proximal phalanx. Mounting to the dorsal side of any phalanx or limb will produce the same effect.

Figure 6:
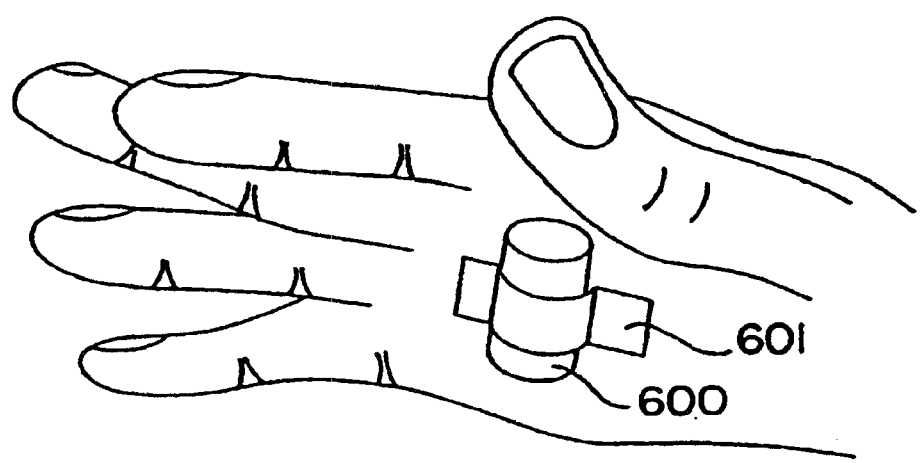
FIG. 6 is a perspective view of a vibrotactile unit attached to the palm of the hand.

FIG. 6 illustrates another way of mounting the vibrotactile unit (600) onto the user using a fastening means (601). In this case the unit is positioned in the palm of the user's hand. If a glove (instrumented or not) is worn, then the unit may also be mounted inside or outside of the glove in a pocket-like cavity, and need not be explicitly affixed to the hand.

Figure 7:
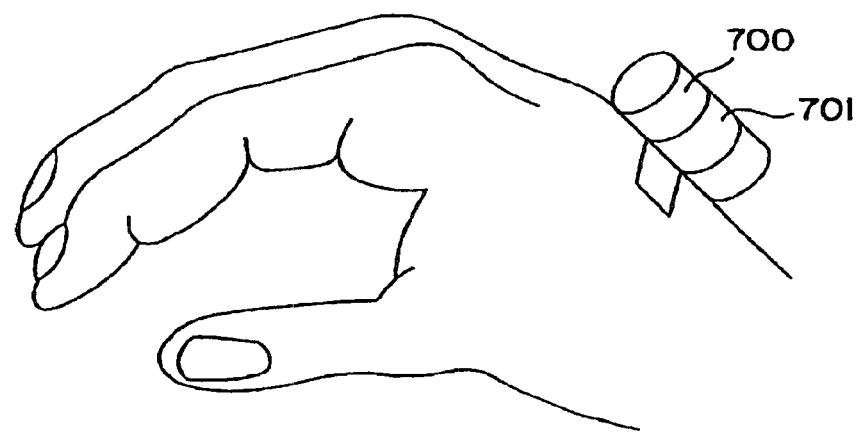
FIG. 7 is a perspective view of a vibrotactile unit attached to the dorsal side of the metacarpus (the back of the hand).

FIG. 7 illustrates another way of mounting the vibrotactile unit (700) onto the user using a fastening means (701). In this case the unit is positioned on the dorsal side of the metacarpus, or the back of the hand Again, if a glove (instrumented or not) is worn, then the unit may also be mounted inside or outside of the glove in a pocket-like cavity, and need not be explicitly affixed to the hand.

Figure 8:
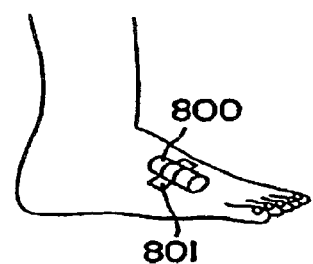
FIG. 8 is a perspective view of a vibrotactile unit attached to the top of the foot.

FIG. 8 illustrates another way of mounting the vibrotactile unit (800) onto the user using a fastening means (801). In this case the unit is positioned on the top of the user's foot. If a sock-like garment (instrumented or not) is worn, then the unit may also be mounted inside or outside of the garment in a pocket-like cavity, and need not be explicitly affixed to the foot.

Figure 9:
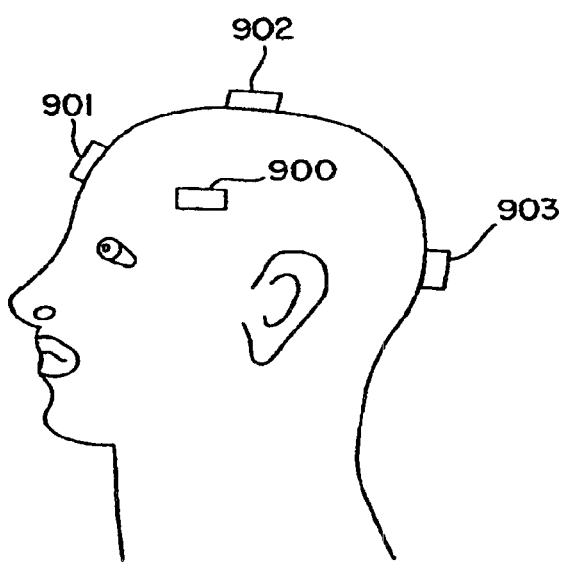
FIG. 9 is a side view of a multitude of vibrotactile units attached to a variety of places on the head.

FIG. 9 illustrates another way of mounting vibrotactile units (900) onto the user. In this example, the units are positioned on the user's head. If a hat-like garment (instrumented or not) is worn, then the units may also be mounted inside or outside of the suit in pocket-like cavities, and need not be explicitly affixed to the body. Examples of locations include, but are not limited to, the temples (900), the forehead (901), the top of the head (902) and the back of the head (903).

Figures 10A, 10B:
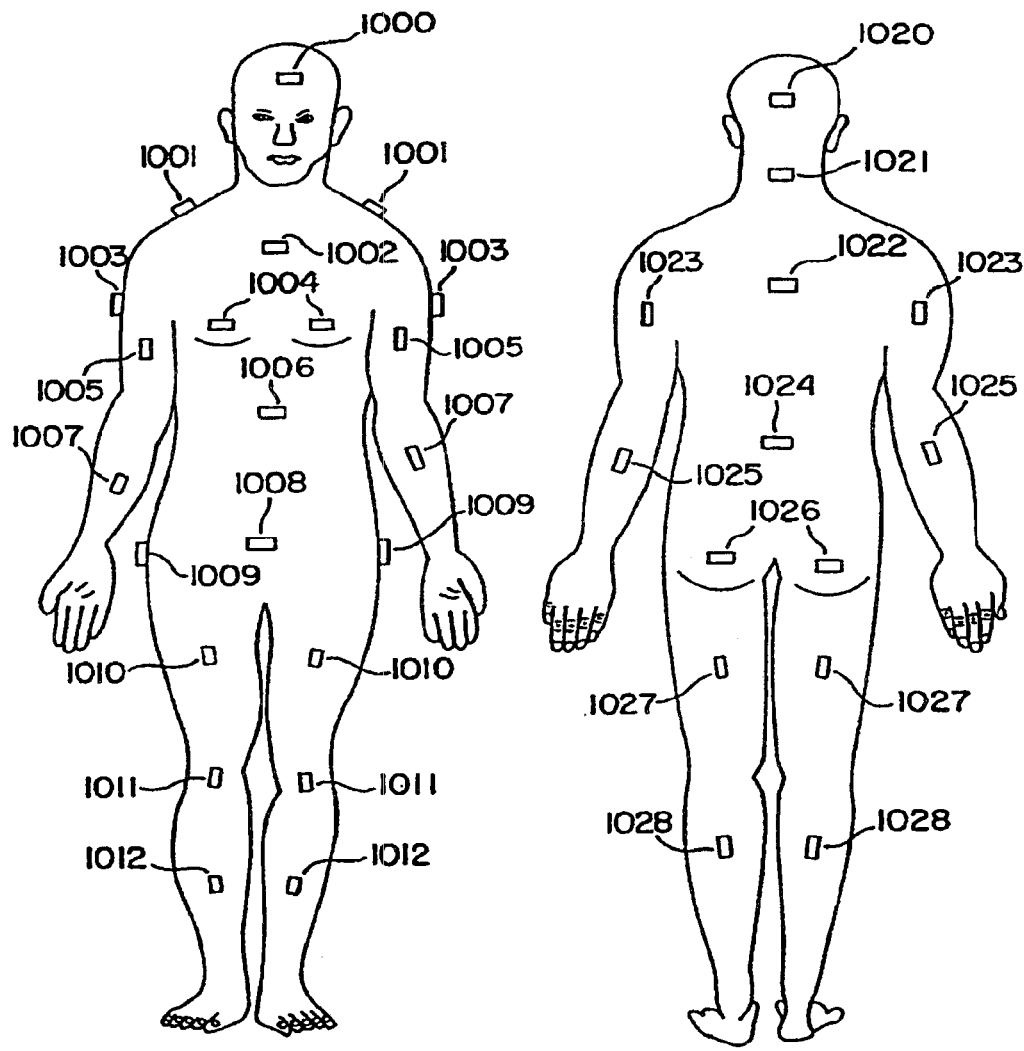
FIGS. 10a and 10b are front and back views respectively, of a multitude of vibrotactile units attached to a variety of places on the body.

FIG. 10a illustrates another way of fastening vibrotactile units (1000-1012) onto the user. In these examples the units are positioned all over the front and the side of the user's body. If a body suit (instrumented or not) is worn, then the units may also be mounted inside or outside of the suit in pocket-like cavities, and need not be explicitly affixed to the body. By actuating a combination of actuators, the perception of the localization of the tactile sensation may be controlled. For example, if the actuators on the forearm (1007) and on the humerus (1005) actuate with equal intensity, the user may have the perception that there is a single source of sensation originating in-between the two. This may apply to any combination of vibrotactile units located anywhere on the body. This effect is also apparent when multiple vibrotactile units are activated in sequence. There is a perception that a single vibration has "moved" between the activating vibrotactile units. The vibrotactile units displayed in the figure show examples of a variety of candidate positions for attaching the units. Some of these positions include, but are not limited to, the forehead (1000), the shoulders (1001), the side of the arm (1003), the humerus (1005), the chest (1002), the nipples (1004), the abdomen (1006), the forearm (1007), the groin (1008), the hips (1009), the thighs (1010), the knees (1011) and the shins (1012).

FIG. 10b illustrates another way of fastening vibrotactile units (1020-1028) onto the user. In these examples the vibrotactile units are positioned all over the back of the user's body. If a body suit (instrumented or not) is worn, then the vibrotactile units may also be mounted inside or outside the body suit in pocket-like cavities, and need not be explicitly affixed to the body. The vibrotactile units displayed in the figure show examples of a variety of candidate positions for attaching the units to the body. Some of these positions include, but are not limited to, the back of the head (1020), the base of the neck (1021), between the shoulder blades (1022), the back of the humerus (1023), the back of the forearm (1025), the lower back (1024), the buttocks (1026), the back of the thighs (1027) and the calves (1028). The vibrotactile units in FIG. 10b may be combined with those in FIG. 10a as well. This plurality of vibrotactile units shows one way that complex tactile sensations may be generated with multiple vibrotactile units.

Figure 11A:
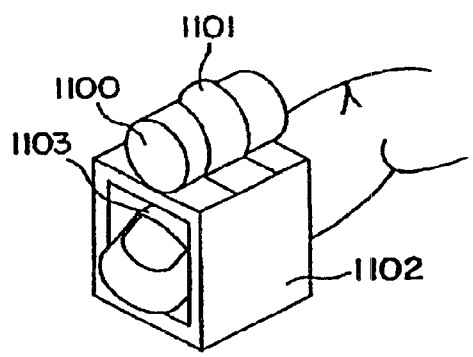
FIGS. 11a and 11b are perspective and front views respectively of a fastening means where the palmar side of the fingertip receives greater stimulation without the vibrotactile unit getting in the way of manipulation.
Figure 11B:
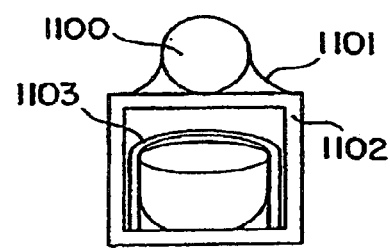

FIGS. 11a and 11b show a vibrotactile unit mounted in such a way that the fingertip may be stimulated without the unit getting in the way of manipulation with the fingers. FIG. 11a shows a perspective view of the invention and FIG. 11b shows a frontal view. A structure (1102), which may be opened or closed at the end, surrounds the fingertip. The fastening means is comprised of three parts: part one affixing the finger to the structure; part two affixing the vibrotactile unit to the structure; part three is the structure (1102). Part one of the fastening means (1103), which can be a flexible or rigid membrane, holds the finger against the structure on the palmar side of the fingertip. This part can be adjustable, fixed, flexible or stretchable. In part two, the vibrotactile unit (1100) is mounted atop the structure, away from the palmar side of the fingertip, using a means (1101) which can be a flexible or rigid membrane. In this manner, the vibrations from the vibrotactile unit may be transmitted through the structure directly to the palmar side of the finger to provide a greater stimulation of the nerves local to the palmar side. In another embodiment, the structure (1102) and the vibrotactile unit casing (1100) can be made of one part, thus eliminating the need for a part two of the fastening means (1101).

Figure 12A:
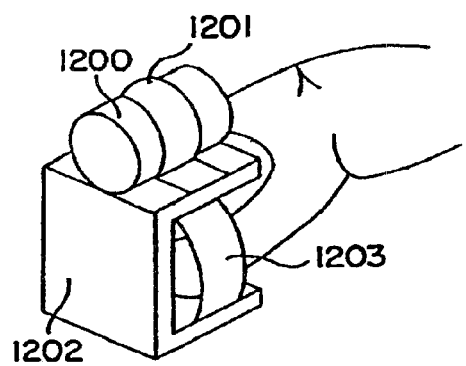
FIGS. 12a and 12b are perspective and front views respectively of a fastening means where the palmar side of the fingertip receives greater stimulation without the vibrotactile unit getting in the way of manipulation.
Figure 12B:
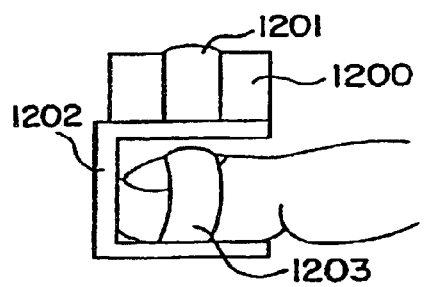

FIGS. 12a and 12b show the vibrotactile unit mounted such that the fingertip can be stimulated without the unit getting in the way of manipulation with the fingers. FIG. 12a shows a perspective view of the invention and FIG. 12b shows a side view. A structure (1202) is attached to the palmar side of the fingertip. The fastening means is comprised of three parts: part one, affixing the finger to the structure; part two, affixing the vibrotactile unit to the structure; part three which is the structure (1202). Part one (1203) may be a flexible or rigid membrane. This part may be adjustable, fixed, flexible or stretchable. In part two, the vibrotactile unit (1200) is mounted atop the structure, away from the palmar side of the fingertip, using a means (1201) which can be a flexible or rigid membrane. In another embodiment, the structure (1202) and the vibrotactile unit casing (1200) can be made of one part, thus eliminating the need for part two of the fastening means (1201).

Figure 13:
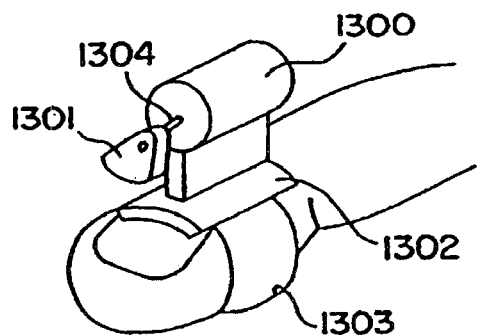
FIG. 13 is a perspective view of a fastening means where no casing is required for the vibrotactile unit because the moving mass is mounted away from the finger thus reducing the possibility of interference.

FIG. 13 shows a vibrotactile unit and fastening means where no casing is required for the mass-moving actuator/mass assembly. A small rigid or semi-rigid structure (1302) elevates the vibrotactile unit above the fingertip in such a way that the finger cannot interfere with the rotation of the eccentric mass (1301) about the main axis of the shaft (1304) of the mass-moving motor (1300). The structure (1302) is attached to the fingertip using a strap (1303) which can be rigid or flexible and which can be either an integral or separate part of the structure.

Figure 14:
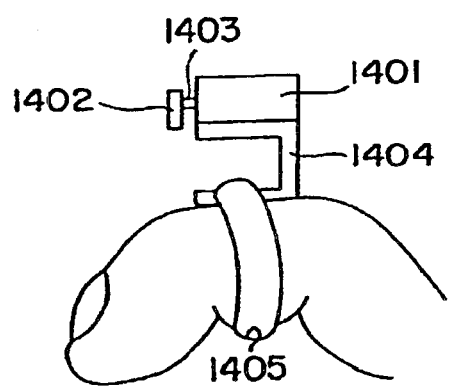
FIG. 14 is a side view of an another fastening means where no casing is required for the vibrotactile unit because the moving mass is mounted away from the finger thus reducing the possibility of interference.

FIG. 14 shows another vibrotactile unit and fastening means where no casing is required for the mass-moving actuator/mass assembly. A small rigid or semi-rigid structure (1404) elevates the vibrotactile unit above the middle phalanx in such a way that the finger cannot interfere with the rotation of the eccentric mass (1402) about the main axis of the shaft (1403) of the mass-moving actuator (1401). The structure (1404) is attached to the middle phalanx using a strap (1405) which can be rigid or flexible and which can be either an integral or separate part of the structure.

Figure 15:
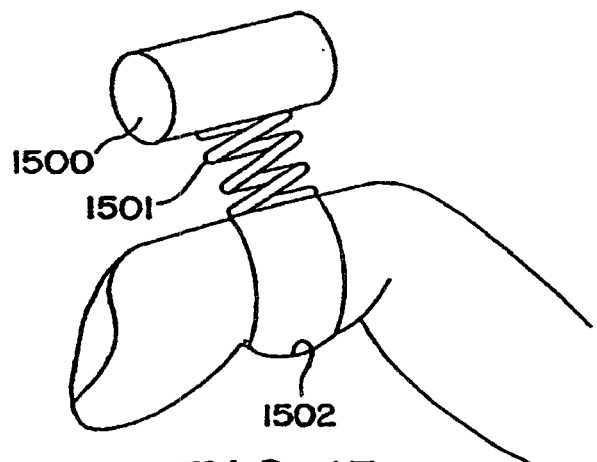
FIG. 15 is a perspective view of a fastening means where the vibrotactile unit is attached to the body via a spring that is used to alter the amplitude and frequency of the sensed oscillations.

FIG. 15 shows yet another vibrotactile unit (1500) and fastening means such that the vibrotactile unit is connected to the fingertip via a form of spring (1501) in order to alter the amplitude and frequency of the perceived vibrations. A strap (1502) which can be a flexible or rigid membrane holds the spring against the fingertip. The spring changes the natural frequency of the vibrotactile unit. Alternatively, the vibrotactile unit/spring apparatus could be attached below the finger instead of above it. The spring may also be replaced by some form of actuator to again control the amplitude and frequency and/or to extend the range of amplitude and frequency. In addition a damper may be introduced in combination with the spring or actuation system to further control and/or extend the amplitude and frequency of the perceived vibrations. An electro-rheological fluid may be used in the damper to control the damping term in the mechanical system.

Figure 16A:
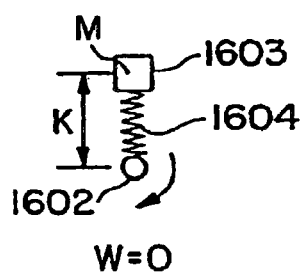
FIGS. 16a, 16b and 16c are front schematic views and 16d is a perspective view of a vibrotactile unit where the radius of the gyration of the eccentric mass increases as the angular velocity of the shaft increases.
Figure 16B:
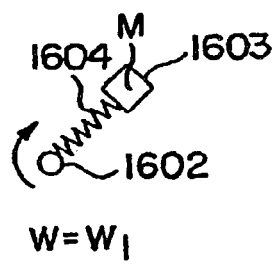
Figure 16C:
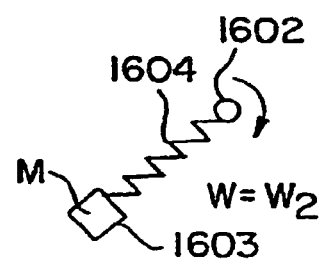
Figure 16D:
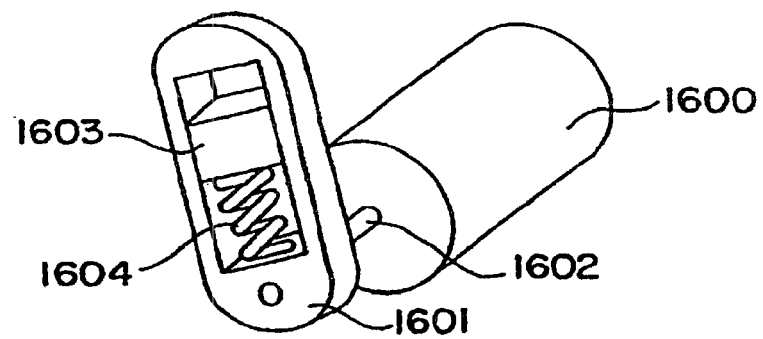

FIGS. 16a, 16b, 16c, and 16d illustrate a modification to the way the eccentric mass is mounted to a shaft. The radius of the gyration K of the eccentric mass increases as the angular velocity of the shaft increases. The top three drawings (FIGS. 16a, 16b, 16c) illustrate the principle, where $w_2 > w_1 > 0$, and the bottom perspective drawing (FIG. 16d) provides an implementation. In FIG. 16d, a structure (1601) is attached the shaft (1602) of the mass-moving actuator (1600). The structure comprises a spring (1604) and mass (1603) assembly. At one end, the spring is attached to the inside of the structure and at the other end it is attached to the mass. The mass is free to move towards and away from the shaft inside a guide in the structure. The radius of gyration K is the distance between the center of gravity of the mass (1603) and the main axis of the mass-moving actuator shaft (1602). As the angular velocity of the shaft increases, the centrifugal forces felt by the mass increase, causing it to stretch the spring further and increase the radius of gyration. This apparatus minimizes the angular inertia of the device at start-up and then gradually increases the eccentricity of the mass so that larger vibrations can be obtained at higher angular velocities. This relieves the stress on the bearings that hold the shaft and reduces the larger initial torque required to initiate rotation (as opposed to the torque required to maintain rotation). Alternatively, the passive spring may be replaced by an active device which controls or sets the radius of gyration of the mass. The active device may comprise a shape memory alloy actuator or any other mechanism capable of controlling the position of the mass.

Figure 17:
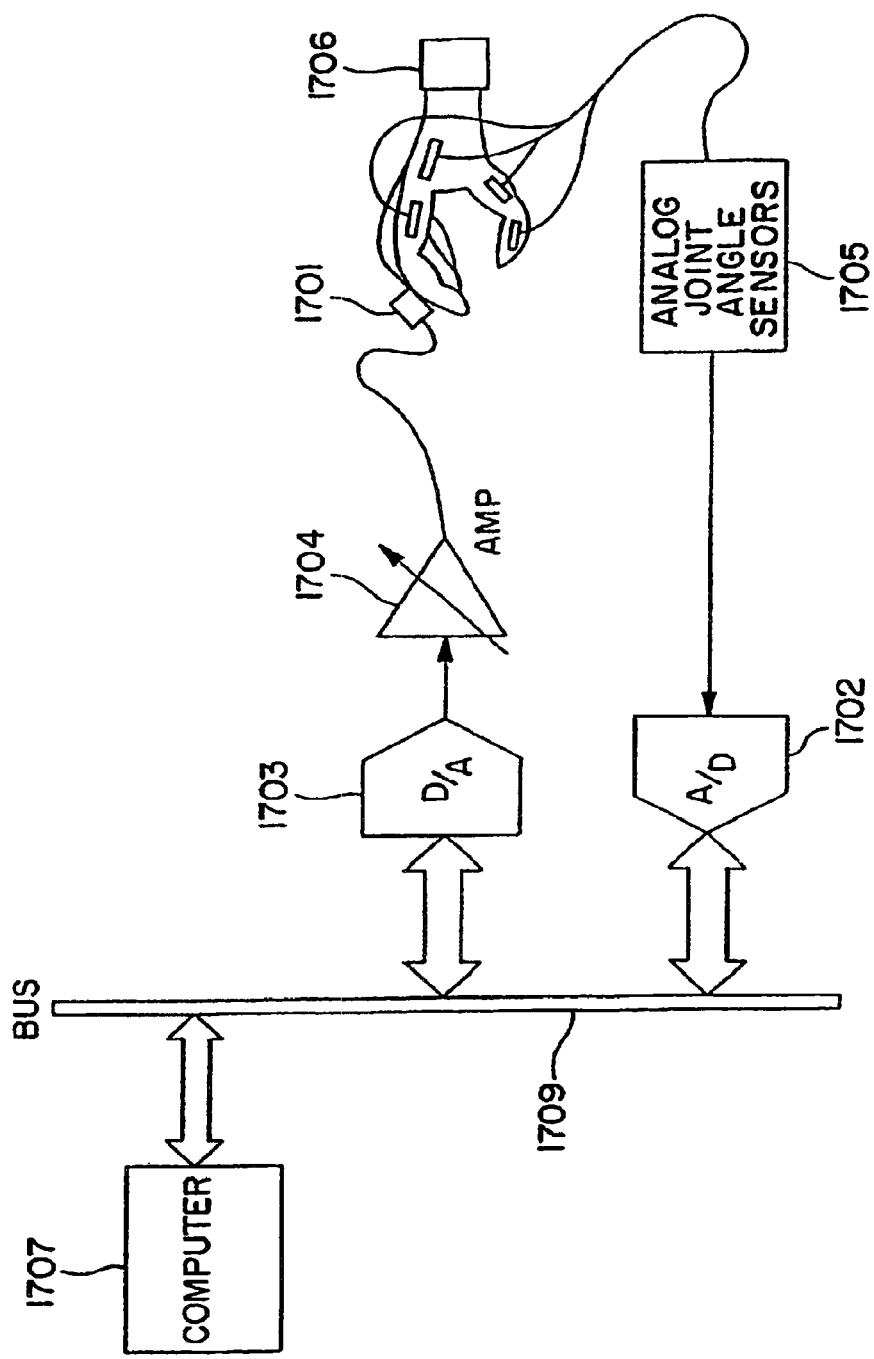
FIG. 17 is a schematic electrical-mechanical signal propagation diagram.

FIG. 17 shows how the electrical and mechanical signals propagate through the tactile feedback control system in a preferred embodiment of the invention. The embodiment shown employs a d.c. servo motor (1701) as the mass-moving actuator of a vibrotactile unit. A computer (1707), or other signal processing means, sends a digital value representing the desired actuation level control signal to the digital-to-analog convert, D/A (1703). The analog output of the D/A is then amplified by a variable gain amplifier (1704) to produce an analog voltage activation signal. This voltage is placed across the servo motor, driving the motor at a desired angular velocity. The voltage signal may alternately be converted to a current activation signal for driving the motor at a desired torque. Velocity damping of the servo control loop may be performed by tachometer feedback (not shown). The computer (1707), digital-to-analog converter (1703), analog-to-digital converter, A/D (1702), bus (1709) and variable gain amplifier (1704) may be elements of a signal processor. Digitized values from A/D (1702) from analog joint angle sensors (1705) provide the position information of the fingers (measured body parts) to the computer as a physical state signal. In a virtual environment application, the physical state signal may cause motion in a corresponding virtual hand. If one of the digits of the virtual hand is found to be intersecting a virtual object, the computer calculates the virtual force to be applied to the virtual digit using knowledge of the virtual object's shape and compliance. The computer then causes an activation signal to be sent to the vibrotactile units mounted on the user's fingers (sensing body part) to convey tactile information about that virtual force. Strain gage, fiber optic, potentiometric, or other angle sensors may be used as analog joint angle sensors (1705). Strain gage angle sensors are disclosed in the Kramer et al. U.S. Pat. Nos. 5,047,952 and 5,280,265, which patents are incorporated herein by reference.

Figure 18A:
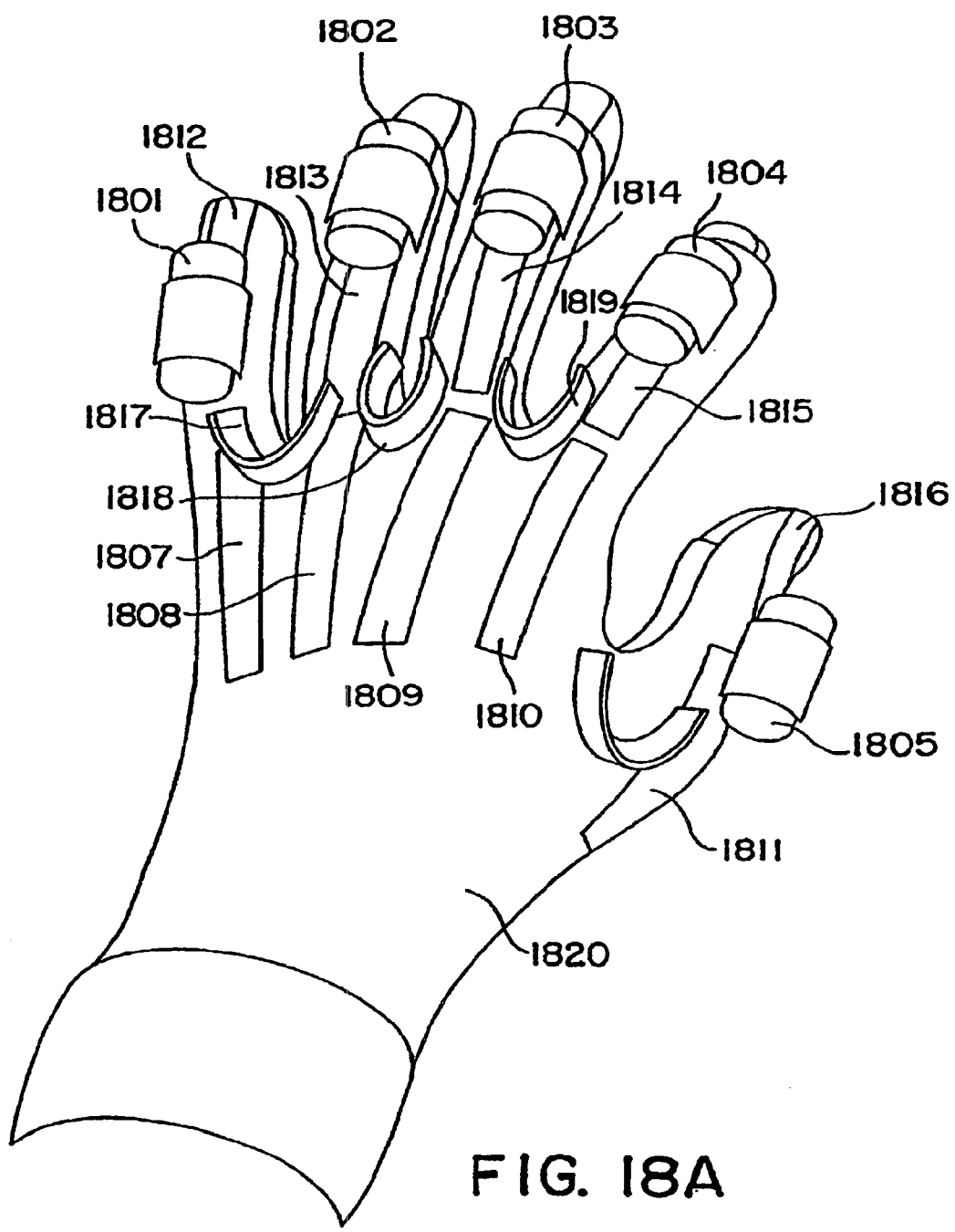
FIGS. 18a and 18b show an instrumented glove, in this case the Virtual Technologies CyberGlove™, with both position sensors and vibrotactile units.
Figure 18B:
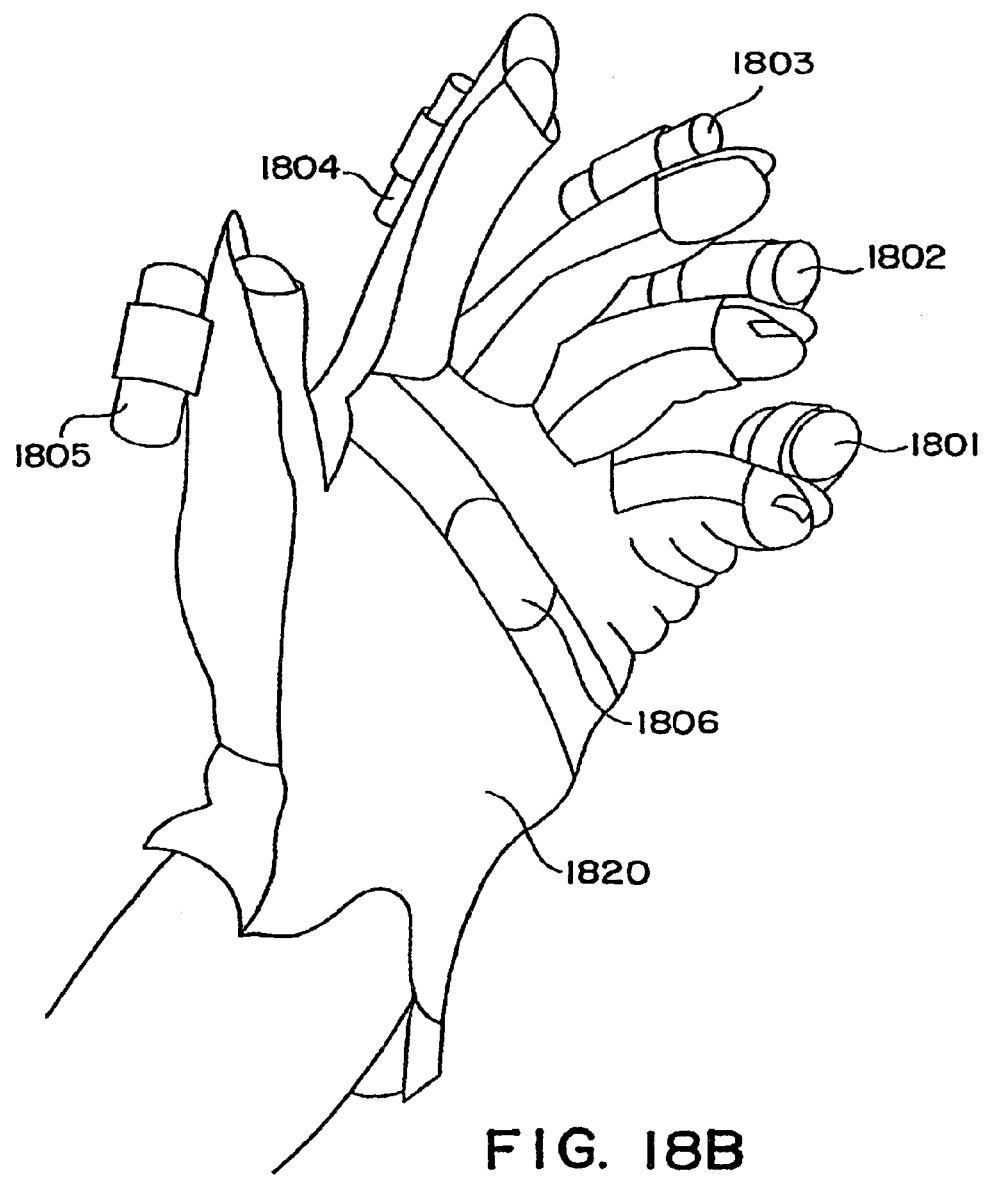

FIG. 18*a* and FIG. 18*b* illustrate a preferred embodiment of the invention. An instrumented glove (1820) such as the CyberGlove™ manufactured by Virtual Technologies of Palo Alto Calif., USA, has sensors (1807-1819) on it which measure the angles of the joints of the hand (the measured body parts). In the figures, the fingertips of the glove are open so that the user may handle physical objects while using the glove. This allows the user to feel the tactile sensations of real objects which may then be used in conjunction with tactile sensations generated from the subject invention. The vibrotactile units (1801-1806) are encased in cylindrical housings and fastened to the glove on each of the fingers (1801-1804), the thumb (1805) and on the palmar (1806) side of the hand. The vibrotactile units are composed of a d.c. motor (item 202 in FIG. 2) with an eccentric mass (item 201 in FIG. 2) mounted onto its shaft (item 204 in FIG. 2). The casing is made of tubular plastic and serves to protect the motion of the mass from the user and protect the user from the rotating mass.

Figure 19A:
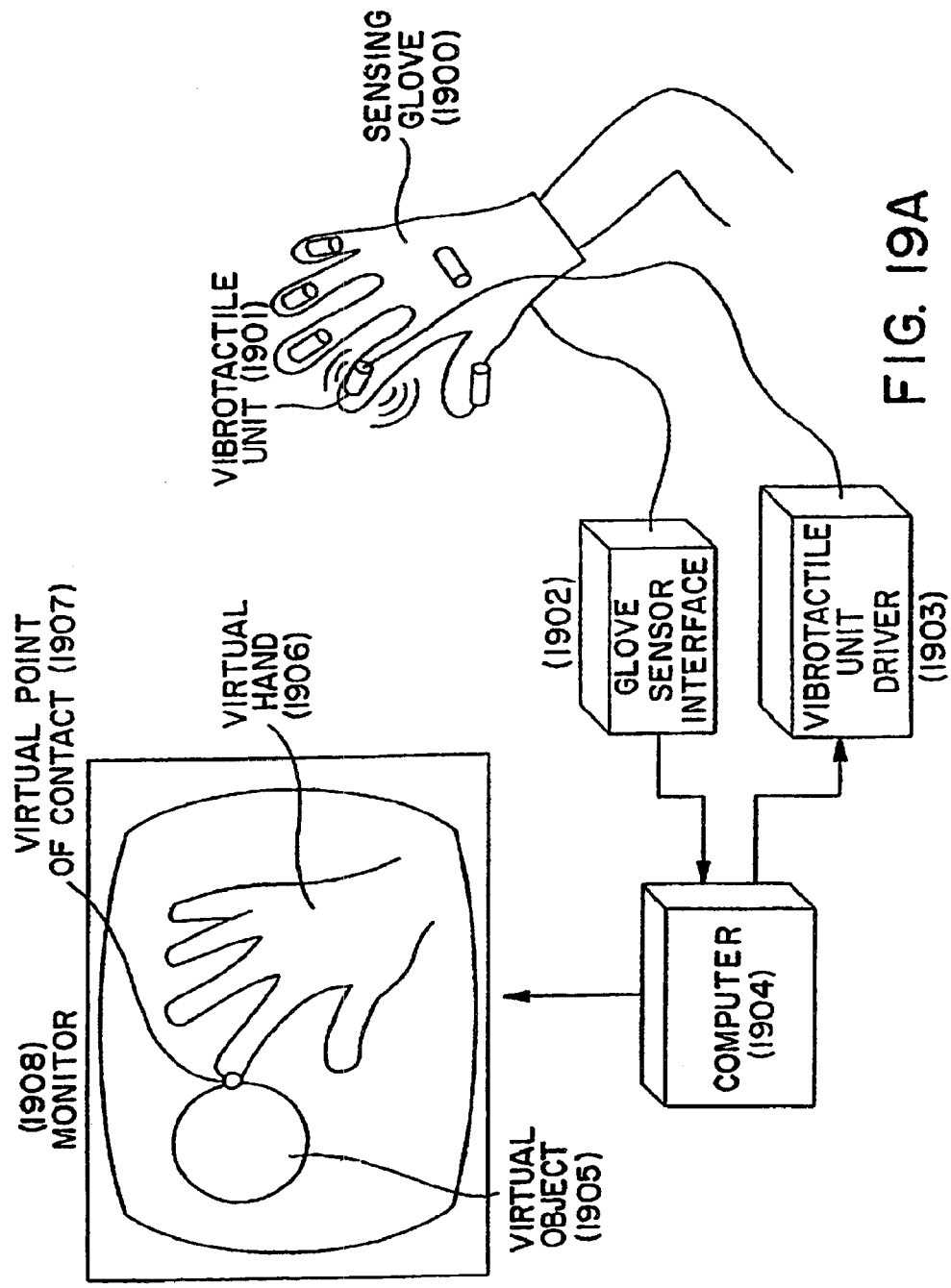
FIGS. 19a and 19b show schematically two applications using a sensing glove with vibrotactile units attached to the fingers and back of the hand.

FIG. 19*a* shows a user wearing a sensing glove (1900) which can measure hand formations as well as the spatial placement of the hand. The sensing glove has vibrotactile units (1901) fastened to the fingers and to the back of the hand. The user receives visual feedback through a graphical representation of his hand on the computer monitor (1908). The computer (1904) receives the state signal (information about the spatial placement of the user's hand) through the sensors mounted on the glove via a glove sensor interface (1902). When the virtual graphical hand (1906) touches (1907) a virtual object (1905) on the monitor, the computer sends a control signal to the vibrotactile unit driver (1903) which then sends the activation signal to the vibrotactile units (1901).

Figure 19B:
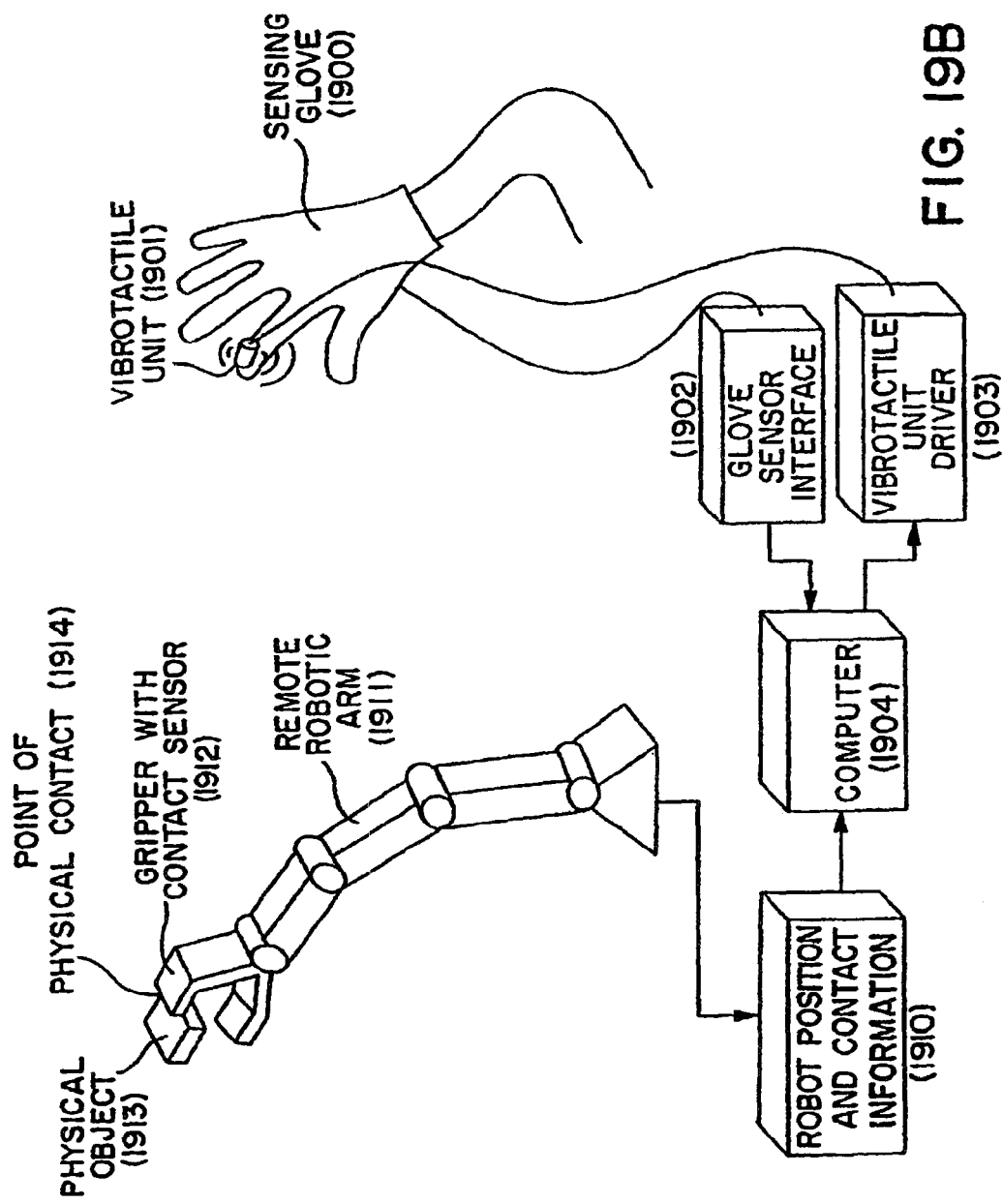

In a similar setup, FIG. 19*b* shows the same glove (1900) and computer interface remotely controlling a robotic arm (1911) instead of a graphic display. The robot has contact sensors on its gripper (1912) that detect when the robot touches physical objects (1913). The user controls the robot arm through the sensors on the glove which produce position readings of the fingers (measured body parts) which are sent to the glove interface device (1902) and then outputted to the computer (1904) which in turn sends the appropriate commands to the robot. Robot position and contact information (1910) is then fed back to the computer as the state signal. The computer interprets this signal and decides what kind of vibrational feedback should be sent to the vibrotactile unit (1901) (other vibrotactile units not shown) on the user via the vibrotactile unit driver (1903). Force or pressure sensors may be mounted on the gripper instead of contact sensors. The user then receives vibrational feedback of varying levels depending on the force or pressure on the object. This allows a teleoperator to perform tasks more efficiently and safely, especially in handling delicate objects that would break under certain grip forces. The user does not necessarily need to control the robot or the objects of contact in order to use the tactile feedback. The vibrotactile device may act simply to inform the user of contact with the object whether or not as a result of the user's actions.

Figure 20:
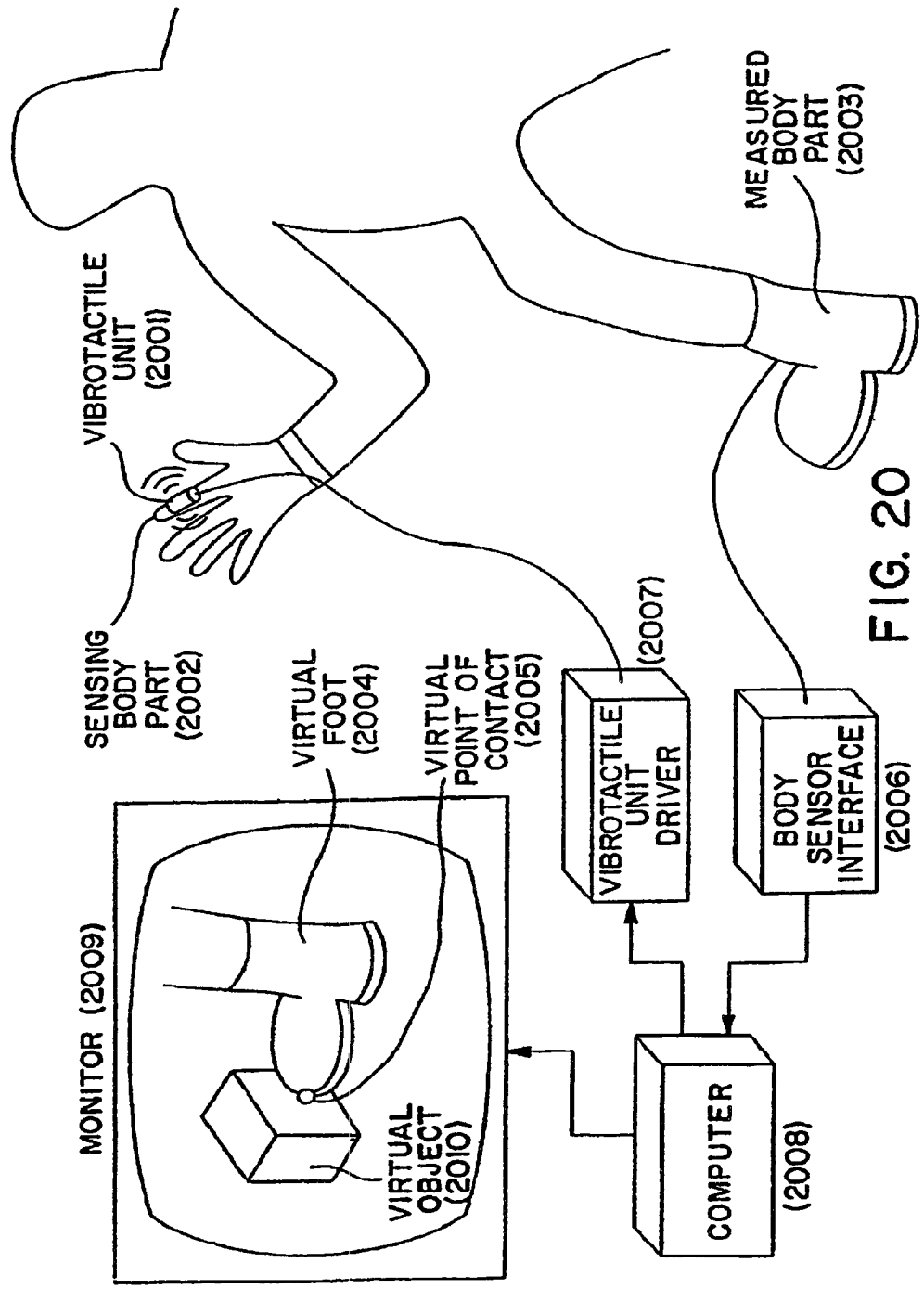
FIG. 20 illustrates schematically an example of a virtual environment with separate sensing and measured body parts.

FIG. 20 illustrates an embodiment in a virtual reality context where the measured body part (2003) is the foot, however, the vibrotactile unit (2001) is mounted on the finger which acts as the sensing body part (2002). The foot has a graphical object (2004) associated with it in the computer simulation. In this case, the graphical object looks like a foot as well. Motions of the foot are sent to the computer (2008) via the body sensor interface (2006) and are reflected on the computer monitor (2009). When the computer (2008) determines that the graphical foot (2004) contacts a virtual object (2010), the computer interprets this state signal and sends a control signal to the vibrotactile unit driver (2007) to activate the vibrotactile unit (2001) on the finger. This may be due to the user moving his foot so that the graphical foot contacts (2005) the virtual object, or the virtual object moving into the graphical foot independent of the user's actions. The user then needs to correlate the contact of the virtual object with the sensation at the fingertip. While this does not seem as natural as vibrating the foot as it makes contact, this illustrates the sensing body part separate from the measured body part. This is necessary if the measuring body part cannot coincide with the sensing body part, for example if the measured body part is the eye-ball or if the measured body part is on another user.

Figure 21A:
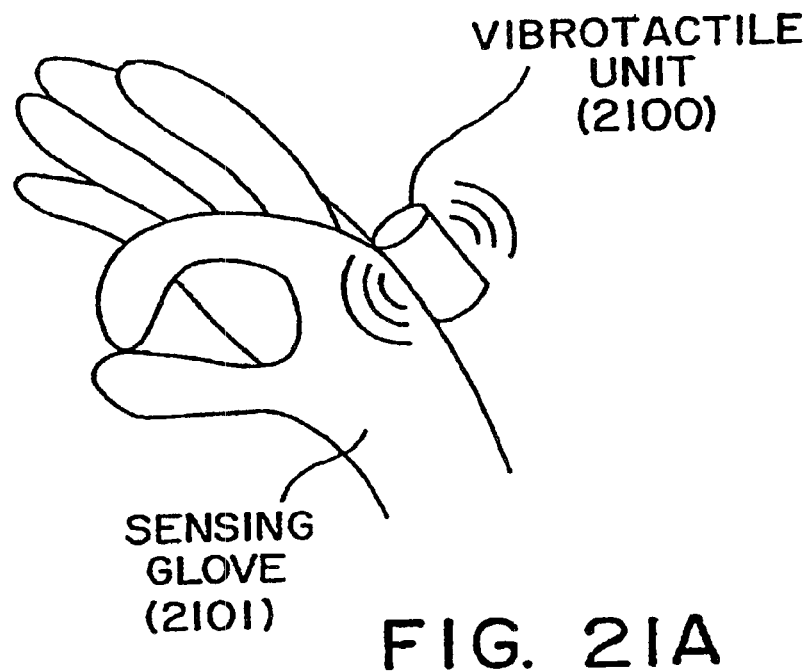
FIGS. 21a and 21b are perspective drawings showing two applications of the invention for gesture recognition.
Figure 21B:
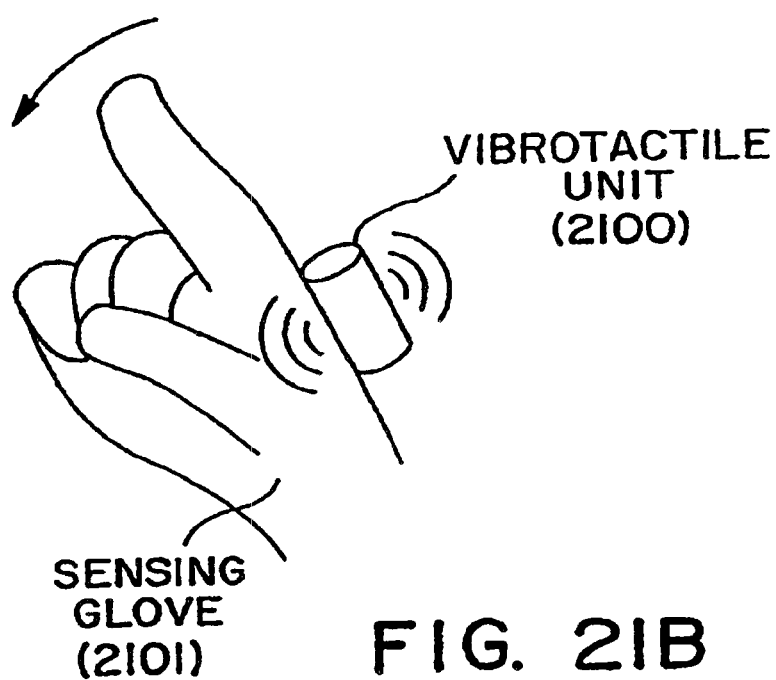

FIG. 21*a* and FIG. 21*b* illustrate a glove (2101) which contains both position sensors and vibrotactile units (2100). The Virtual Technologies CyberGlove™ is an example of a glove with appropriate position sensors. The sensors measure the spacial placement of the hand and fingers. A computer uses gesture recognition software to determine if a pre-specified hand formation or motion has been gesticulated. In FIG. 21*a*, the vibrotactile unit signals the user that a particular static pose has been detected. A different vibrotactile sensation can be generated in response to a recognized moving hand or arm gesture that includes dynamic motions (FIG. 21*b*). This may also be useful in training the gesture recognition software for the gestures to be recognized. In training the software, a user must repeatedly make the same gesture to obtain some sort of average position since humans cannot repeat gestures exactly. With the vibrotactile feedback, the user may be trained to better repeat his gestures while at the same time training the recognition software to recognize his gestures. Better repetition of the gestures reduces the statistical distribution of the sensor readings for a given hand gesture which in turn may improve the performance of the recognition system.

Figure 22:
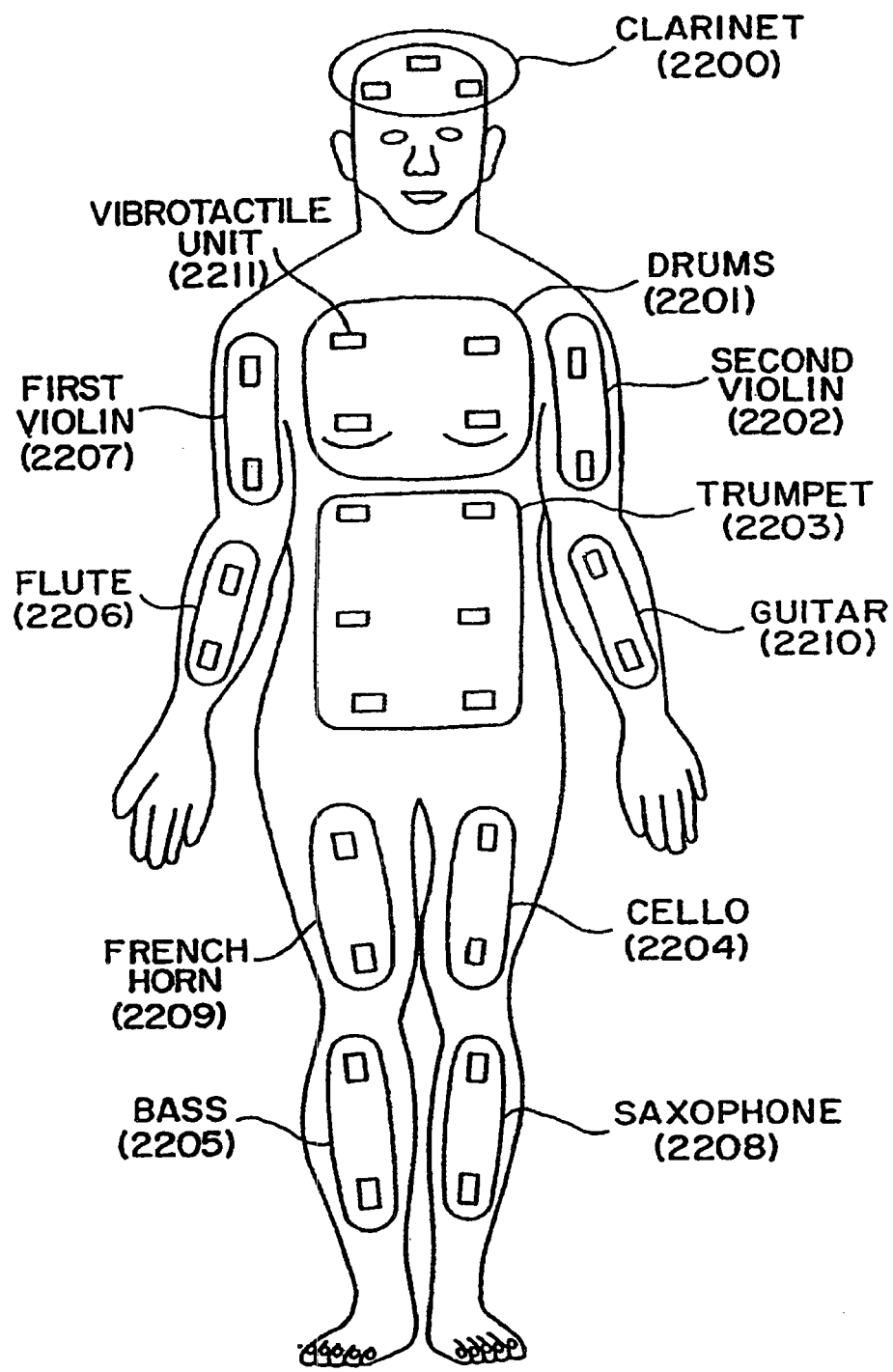
FIG. 22 is a schematic drawing showing a musical application.

FIG. 22 illustrates vibrotactile units in a musical application. The units are attached to a body suit or mounted directly onto the user's clothing. Different regions on the body (2200-2210), which contain groupings of vibrotactile units (2211), may correspond to different musical instruments in an orchestra and serve to enhance the musical experience. For example, music produced by a cello produces proportional vibrations on the user's thigh (2204) through the vibrotactile units located in that body region. Similarly, the drums induce vibrations in the units that stimulate the chest area (2201) and so on. Sections of the body containing multiple vibrotactile units corresponding to one instrument type may have individual vibrotactile units corresponding to individual instruments. For example, the cello section of the body is shown to have the first chair cello on the upper thigh, and the second chair cello on the lower thigh. The user may either be a passive listener "feeling" the instruments as well, or he may be an active participant in creating the music, receiving the vibrotactile sensations as feedback.

FIG. 23 illustrates an entertainment application. In this case an array of vibrotactile units simulates water flow or wind. In this illustration a user is lying on a couch (2300) and is immersed in a virtual beach scene and sees the beach through a head-mounted display (2302). The user hears ocean sounds through head-mounted earphones (2301) and feels warmth from the sun through heat lamps (2303). The user then feels wind simulated by the vibrotactile units as they are pulsed in sequence creating "waves" of sensation. For example, the wind could flow from head to toes by alternatively pulsing the vibrotactile units starting with the ones on the head (2304) and ending with the ones on the toes (2305). Similarly, water is felt as pulsed waves (although perhaps of larger amplitude), as the user swims through the virtual water. In this fashion, the user may be relaxed or entertained.

FIG. 24a and FIG. 24b illustrate a medical application where, for example, a user has injured a knee. A vibrotactile unit (2401) is used in conjunction with bend sensors (2400) mounted on the knee during physical therapy sessions as shown in FIG. 24a. The vibrotactile unit notifies the user when the knee is exercised appropriately and alerts the user if the knee is flexed further than a safe limit prescribed by a doctor and thus improve recovery as is illustrated in FIG. 24b. Furthermore, the vibrotactile units, in conjunction with other sensors, may be used in any biofeedback application.

Figure 25A:
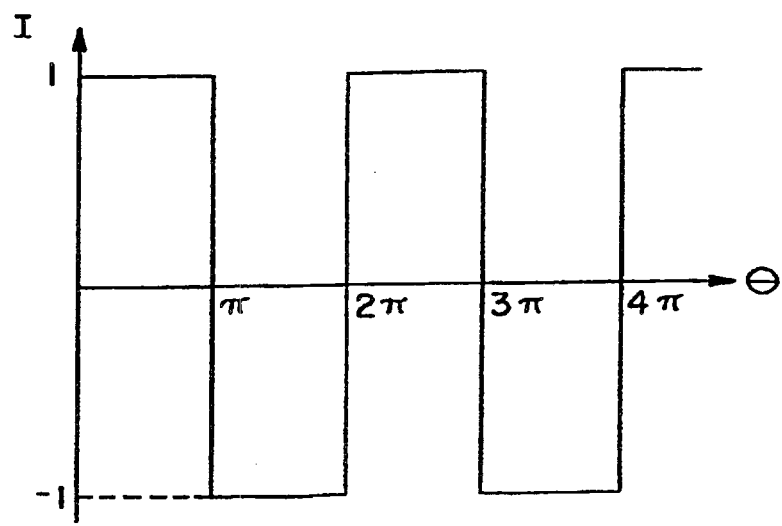
FIGS. 25a, 25b and 25c are a schematic drawings illustrating an amplitude decoupling method.
Figure 25B:
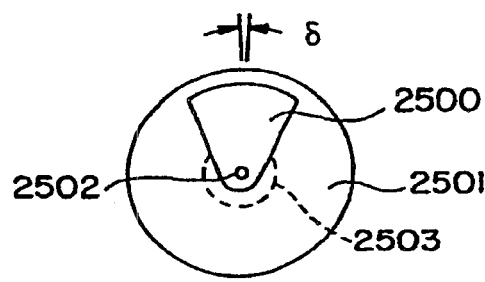
Figure 25C:
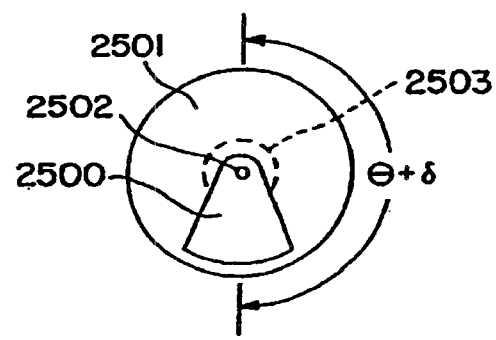

FIGS. 25a, 25b and 25c illustrate an approach for decoupling the amplitude and frequency components of the vibrations generated by an eccentric mass-based vibrotactile unit. In this embodiment, the vibrotactile unit comprises a rotary electric motor (2501), a mass mounted eccentrically (2500), a sensor (2503) mounted on the shaft (2502) to determine the angular position of the shaft and a closed-loop control system. Any other control law may be used that achieves a single rotation of the shaft. One example is shown in FIG. 25a. The vertical axis of the graph represents a normalized current, the horizontal axis represents the rotation of the axis in radians. This corresponds to the following non-linear control law:

$$I=1, (\delta \geq \theta > \pi)$$

$$I=-1, (\pi \geq \theta > 2\pi - \delta)$$

$$I=0, (-\delta > \theta > \delta)$$

With the initial conditions set so that the velocity is zero and rotational position of the mass, θ, (in radians) is equal to a small value, δ, (FIG. 25b) sending current, I, to the motor in this manner would cause the mass to accelerate for half of a full rotation, up to θ+δ (FIG. 25c), and decelerate for the other half of the rotation coming to a stop between the −δ and +δ position in the ideal case. The actual position of the −δ and the +δ position may have to vary depending on the bandwidth of the control loop and the friction and damping of the system. The magnitude of vibration or impulse is set by the amplitude of the current, the frequency is set by repeating the above control at the desired frequency. A simple feedback control loop (PID for example) could ensure the initial conditions are correct before each pulse. The details of this are common knowledge to those skilled in the art.

Figure 26A:
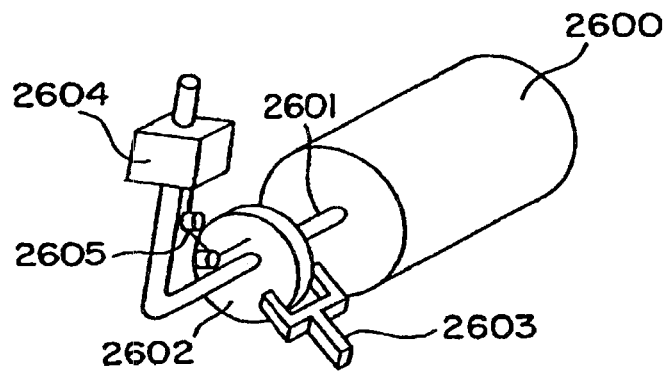
FIG. 26a is a perspective drawing and FIG. 26b is a side view of a vibrotactile unit with a controllable eccentricity.
Figure 26B:
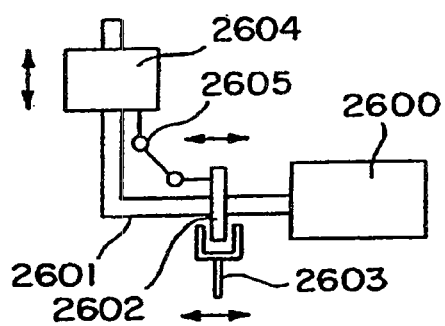
Figure 26C:
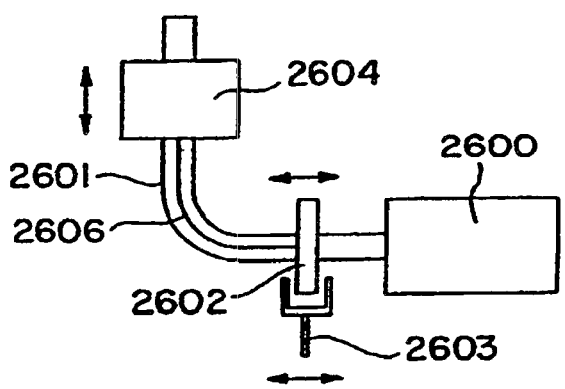
FIG. 26c is an alternative transmission method that can be used to control the eccentricity of the mass.

FIG. 26a is a perspective drawing and FIG. 26b is a side view of a vibrotactile unit with controllable eccentricity. A structure, such as a slip-disk (2602), is mounted on the shaft (2601) and is free to slide back and forth along the shaft. The slip-disk is attached to a linkage (2605) which connects it to the eccentric mass (2604). A positioning device (2603) controls the position of the slip-disk on the shaft, which in turn affects the position of the mass (via the linkage) and thus its eccentricity. FIG. 26c is an alternative transmission method that can be used to control the eccentricity of the mass. In FIG. 26c, the transmission comprises element (2606), which may be a flexible membrane or fluid inside a hollow shaft (2601) that is connected to the eccentric mass (2604) at one end and the sliding slip-disk (2602) at the other. Again, controlling the position of the disk along the shaft using the positioning device (2603) affects the eccentricity of the mass. Element 2606 may also be a fluid and 2604 a hollow container. As the fluid is forced through the tube (2601) by the slip-disk (2602), or by some other pressure generating means, the container (2604) is filled with the fluid, thus, increasing the effective radius of gyration of the center of mass of the fluid. By increasing the radius of gyration, by whichever means, it is possible to independently control the amplitude and frequency of vibration of the vibrotactile unit.

Figure 27:
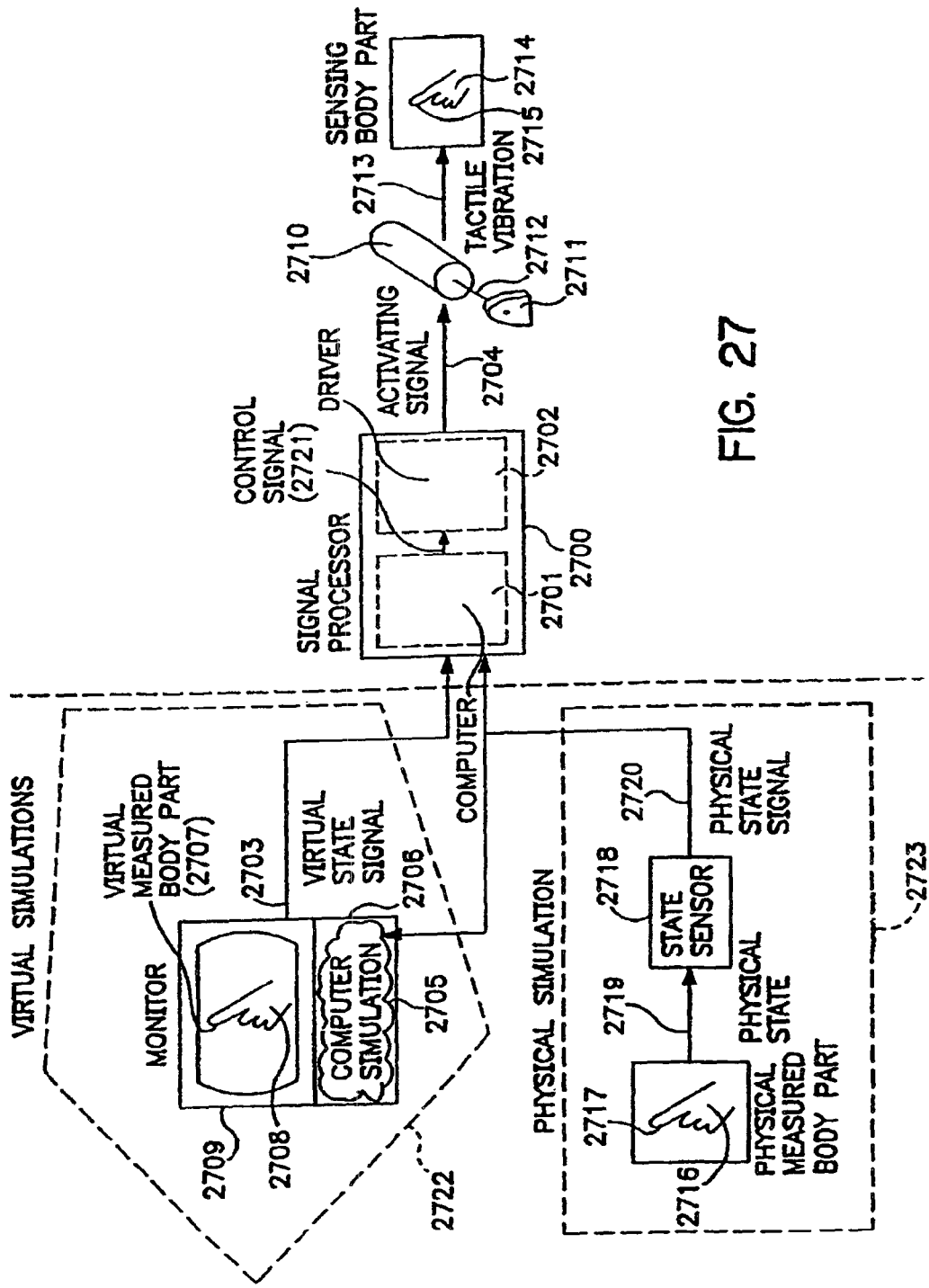
FIG. 27 is an exemplary diagrammatic view of an application comprising the vibrotactile device, a virtual simulation and a physical simulation.

FIG. 27 provides an exemplary block diagram of the components and functional relationship between the components comprising the vibrotactile device when used in an application. Although some components are shown interrelated with a unidirectional arrow, the arrows may be bidirectional to provide bidirectional flow of information. Additional arrows may be added between blocks to provide for communication between components. An application may include presenting vibrotactile sensation to a body part of a user, where the vibrotactile sensation is associated with a virtual environment simulation (virtual simulation) and/or the physical state of a body (physical simulation), which may be the user's body, or another person's body. One or more virtual simulations may co-exist with one or more physical simulations, and may be combined with further types of simulations to yield a vibrotactile sensation.

The exemplary virtual simulation (2722) of FIG. 27 comprises a computer (2706) with computer monitor (2709). To produce the virtual simulation, the computer typically generates, processes, executes or runs a computer simulation (2705) which is typically in the form of a computer software program. In the exemplary virtual simulation, the computer produces a graphical display of a virtual measured body part on the monitor, where the body part is shown to be a fingertip (2707) on a virtual hand (2708). The virtual simulation may internally generate an internal state with a variety of state variables which comprise a virtual state signal (2703) to provide to a signal processor (2700). Exemplary virtual state variables include position, velocity, acceleration, mass, compliance, size, applying force or torque, composition, temperature, moisture, smell, taste and other dynamical, structural, physical, electrical metabolical, moodal, cognitive, biological and chemical properties of various portions internal to, and on the surface of, a virtual measured body part. States variables may also denote functions of state variables, such as contact of various parts of the virtual hand.

FIG. 27 also provides an exemplary physical simulation (2723) comprising a state sensor (2718) and a physical measured body part (2717). In this example, the physical measured body part is depicted as a fingertip (2717) on a physical hand (2716). The state sensor measures the physical state (2719) of the physical measured body part and produces a physical state signal (2720) to provide to the signal processor (2700). The physical state signal (2720) is optionally provided to the computer (2706) and/or computer simulation (2705) of a virtual simulation (2722). Exemplary physical state variables include position, velocity, acceleration, mass, compliance, size, applying force or torque, composition, temperature, moisture, smell, taste and other dynamical, structural, physical, electrical, metabolical, moodal, cognitive, biological and chemical properties of various portions internal to, and on the surface of, a physical measured body part. States variables may also denote functions of state variables, such as contact of various parts of the physical hand.

As shown in FIG. 27, for both the virtual simulation and the physical simulation, the signal processor (2700) receives a state signal and produces an activating signal (2704). For the virtual simulation, the state signal is the virtual state signal (2703); for the physical simulation, the state signal is the physical state signal (2720). When the application comprises both a virtual simulation and a physical simulation, both a virtual state signal and a physical state signal may be presented to the signal processor.

The signal processor may employ a digital or analog computer (2701) to interpret one or more input state signals (e.g., a virtual or physical state signal) and produce a control signal (2721) which becomes the input signal to a driver (2702). Using the control signal, the driver produces the activating signal (2704). When the computer is absent from the signal processor, the driver determines the activating signal from the state signal or signals. Whether or not the computer is present in the signal processor, the activating signal is provided in a form for use by the mass-moving actuator (2710). For example, the driver may comprise a motion control module, an operational amplifier, a transistor, a fluidic valve, a pump, a governor, carburetor, and the like. In the case where the mass-moving actuator is an electric motor, the activating signal may be a voltage or current with sufficient electrical power or current drive to cause the motor to turn.

In FIG. 27, the mass-moving actuator (2710) is shown to be an electric motor which turns a shaft (2712) and an eccentric mass (2711). As the mass is rotated, the entire assembly of 2710, 2711 and 2712 vibrates, producing vibrations (2713). Such vibrations are transmitted to a sensing body part of a user who perceives a tactile sensation. In the figure, the sensing body part is exemplified as the fingertip (2715) of a hand (2714).

An exemplary application which comprises a virtual simulation and a physical simulation is summarized as follows:

A fingertip of a physical hand corresponds to both the sensing body part (2715) and the physical measured body part (2717). An instrumented glove, optionally comprising a joint angle sensor and spatial position sensor, produces a physical state signal (2720) corresponding to the position of the physical fingertip. The fingertip position is provided via a wire (e.g., electrical or optical), computer bus or other electrical or optical connecting means to a computer (2706) running a computer simulation (2705) in software. The fingertip position is often provided in the form of digital values, typically as joint angles and/or values corresponding to the six possible spatial degrees of freedom. The fingertip position may also be in the form of an analog voltage.

The computer simulation uses the physical state signal (2720) corresponding to the physical fingertip position (2719) to simulate the position and motion of a virtual hand (2708) and fingertip (2707). The computer simulation displays the virtual hand on a computer monitor (2709), in addition to displaying a second virtual object whose attributes may correspond to a second physical measured object, such as a block, ball, car interior, engineering part, or other object. The computer monitor may be a desk-top monitor, head-mounted monitor, projection monitor, holographic monitor, or any other computer generated display means. The second physical measured object may also be a body part of the user or a second user.

When the user moves his hand, producing a movement of the virtual hand, the computer simulation detects a level of virtual contact between the virtual fingertip (2707) and the second virtual object. The computer simulation then produces a virtual state signal (2703) where one state variable denotes the level (e.g., amount of force) of the virtual contact of the virtual fingertip. The virtual state signal is transmitted to the signal processor (2721) via a wire (e.g., electrical or optical), computer bus or other electrical or optical connecting means. The signal processor may exist in the computer (2706), in which case the virtual state signal is typically transmitted via the computer bus. When the signal processor exists in a separate enclosure from the computer, the virtual state signal is typically transmitted via a wire.

The signal processor may convert the state variable level of virtual contact into an activating signal voltage proportional to the level of virtual contact force using a digital-to-analog converter followed by an operational amplifier. The voltage is presented to the mass-moving actuator (2710) typically by a wire (e.g., electrical or optical) or other electrical or optical connecting means. The mass-moving actuator may be a variable speed electric motor which spins eccentric mass (2711) on its shaft (2712). The electric motor with eccentric mass are housed in a plastic housing or casing which is affixed to the dorsal portion of the instrumented glove surrounding the fingertip, which fingertip corresponds to both the physical measured body part and the sensing body part. The affixing is typically done with straps, sewing, gluing and the like. As the eccentric mass rotates, the electric motor, mass, casing and sensing body part all vibrate, typically at a common frequency. Ideally, there is little vibrational attenuation between the mass and the sensing body part such that as the eccentric mass rotates, the electric motor, mass, casing and sensing body part all vibrate with the same amplitude.

In the application just described, the user may perceive a cause-and-effect relationship between motion of his fingertip and the level of vibration he feels. Thus, the position, compliance, mass, shape and other attributes of a virtual object may be detected by movement of the user's fingertip, or by movement of the virtual object, inducing various vibrotactile responses. The vibrotactile device of the subject invention promotes a sensation of immersion in a virtual environment where the user is able to interact with virtual objects as if he were interacting with physical objects in a physical environment.

Any publication or patent described in the specification is hereby included by reference as if completely set forth in the specification.

While the invention has been described with reference to specific embodiments, the description is illustrative of the invention and is not to be construed as limiting the invention. Thus, various modifications and amplifications may occur to those skilled in the art without departing from the true spirit and scope of the invention as defined by the appended claims.

What is claimed is:

1. A system, comprising:
a computing device comprising a memory and a processor communicatively coupled to the memory, wherein the processor is configured to execute processor-executable instructions stored in the memory to:
generate a graphical interface that includes a graphical object;
obtain at least one spoken utterance;
control an interaction of the graphical object within the graphical interface based on the at least one spoken utterance; and
generate an activating signal based on the at least one spoken utterance;
a user interface device configured to receive the at least one spoken utterance, provide the at least one spoken utterance to the computing device, and control the graphical object within the graphical interface based on the provided at least one spoken utterance, wherein the graphical object comprises a graphical representation within the graphical interface; and
a vibrotactile device comprising an actuator disposed within a housing of the user interface device, thereby protecting the actuator from contact by the user, the actuator configured to receive the activating signal, wherein the activating signal causes the actuator to impart a force via the housing, the actuator comprising a rotating mass actuator having a shaft and an eccentric mass coupled to the shaft, wherein the rotating mass actuator produces the force by the mass rotating about the shaft around an axis of rotation and wherein a center of mass of the eccentric mass is offset from the axis of rotation thereby causing the force when the eccentric mass rotates about the shaft.

2. The system of claim 1, further comprising:
a second user interface device configured to be operated by a second user; and
a second actuator disposed within a housing of the second interface device, thereby protecting the second actuator from contact by the second user, the second actuator configured to receive the activating signal, wherein the activating signal causes the second actuator to impart a force to the second user.

3. The system of claim 1, wherein the actuator includes a moving portion that causes the force, wherein the moving portion is protected from contact by the user.

4. The system of claim 1, wherein the user interface device further comprises:
a fastener configured to fasten the user interface device to the user.

5. The system of claim 1, wherein the user interface device comprises a handheld interface device.

6. The system of claim 1, wherein the activating signal causes the actuator to impart the force that varies by frequency.

7. The system of claim 1, wherein the graphical interface includes a second graphical object and wherein the interaction is between the graphical object and the second graphical object.

8. The system of claim 7, wherein the imparted force varies based on a virtual pressure applied to the second graphical object.

9. The system of claim 1, wherein the actuator comprises a linear actuator.

10. The system of claim 1, wherein the force comprises a varying amplitude over a duration of the force.

11. The system of claim 1, wherein the activating signal causes the actuator to output the force as a series of pulses.

12. The system of claim 1, wherein the force produces a tactile sensation.

13. The system of claim 1, wherein the processing device is configured to generate the activating signal based further on one or more states of the graphical object, the one or more states comprising a position, a velocity, or an acceleration of the graphical object within the graphical interface.

14. The system of claim 1, wherein the activating signal causes the actuator to impart one or more of visual, auditory, taste, smell, or temperature cues to the user.

15. The system of claim 1, wherein the housing is mounted onto a sensing instrument, the sensing instrument comprising one or more sensors that measure one or more physical conditions of the user.

16. A non-transitory computer-readable storage medium storing processor-executable instructions, the instructions when executed configuring the processor to perform a method, the method comprising:
displaying a graphical interface, the graphical interface including a graphical object;
receiving a signal representative of at least one spoken utterance from a user interface device configured to control the graphical object in the graphical interface, wherein the graphical object comprises a graphical representation of at least a portion of a body of a user;
controlling an interaction of the graphical object within the graphical interface based on the signal representative of the at least one spoken utterance;
generating an activating signal based on the signal representative of the at least one spoken utterance; and
transmitting the activating signal to the user interface device based on an interaction related to the graphical object in the graphical interface,
wherein the activating signal causes an actuator disposed within a housing of the user interface device to output a force via the housing, the actuator disposed within the housing to protect the actuator from contact by the user and wherein the actuator comprises a rotating mass actuator having a shaft and an eccentric mass coupled to the shaft, wherein the mass is rotated about the shaft around an axis of rotation to produce the force, wherein a center of mass of the eccentric mass is offset from the axis of rotation thereby causing the force when the eccentric mass rotates about the shaft.

17. The non-transitory computer readable storage medium of claim 16, wherein the graphical interface includes a second graphical object and wherein the interaction comprises a collision between the graphical object and the second graphical object in the graphical interface.

18. The non-transitory computer readable storage medium of claim 16, wherein the force produces a tactile sensation.

19. The non-transitory computer readable storage medium of claim 16, wherein the force varies by amplitude over a duration of the force.

20. The non-transitory computer readable storage medium of claim 16, wherein the activating signal causes the actuator to output the force as a series of pulses.

21. An apparatus comprising:
an input configured to receive at least one spoken utterance to control a graphical object within a graphical interface, wherein the graphical object comprises a graphical representation of at least a portion of a body of a user;

at least one processor configured to:
   generate a signal based on the at least one spoken utterance;
   cause the signal to be transmitted to a host computer; and
   receive from the host computer an activating signal based on the generated signal; and a vibrotactile device comprising an actuator configured to output a force based on the activating signal in coordination with the graphical interface, wherein the actuator is disposed within the housing, thereby protecting the actuator from contact by the user, and wherein the actuator comprises a rotating mass actuator having a shaft and an eccentric mass coupled to the shaft, wherein the mass is rotated about the shaft around an axis of rotation to produce the force, wherein a center of mass of the eccentric mass is offset from the axis of rotation thereby causing the force when the eccentric mass rotates about the shaft.

22. A computing device, comprising:
one or more processors configured to:
   generate a graphical interface, wherein the graphical interface comprises at least one graphical object;
   obtain at least one spoken utterance from an interface device;
   control the at least one graphical object based on the at least one spoken utterance from the interface device;
   generate an activating signal based on the at least one spoken utterance from the interface device, wherein the activating signal is configured to cause an actuator to impart a force; and
   provide the activating signal such that the actuator is caused to impart the force, the actuator comprising a rotating mass actuator having a shaft and an eccentric mass coupled to the shaft, wherein the mass is rotated about the shaft around an axis of rotation to produce the force and wherein a center of mass of the eccentric mass is offset from the axis of rotation thereby causing the force when the eccentric mass rotates about the shaft.

23. The computing device of claim 22, wherein the at least one spoken utterance comprises at least one spoken word.

\* \* \* \* \*